US007321956B2

(12) United States Patent
Gschwind et al.

(10) Patent No.: US 7,321,956 B2
(45) Date of Patent: *Jan. 22, 2008

(54) METHOD AND APPARATUS FOR DIRECTORY-BASED COHERENCE WITH DISTRIBUTED DIRECTORY MANAGEMENT UTILIZING PREFETCH CACHES

(75) Inventors: Michael Karl Gschwind, Chappaqua, NY (US); Charles Ray Johns, Austin, TX (US); Thoung Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 452 days.

This patent is subject to a terminal disclaimer.

(21) Appl. No.: 10/809,579

(22) Filed: Mar. 25, 2004

(65) Prior Publication Data

US 2005/0216672 A1    Sep. 29, 2005

(51) Int. Cl.
*G06F 13/00* (2006.01)
*G06F 12/00* (2006.01)
(52) U.S. Cl. .................. 711/145; 711/137; 711/141; 711/147
(58) Field of Classification Search .............. None
See application file for complete search history.

(56) References Cited

U.S. PATENT DOCUMENTS 5,848,254 A * 12/1998 Hagersten .................. 712/207

(Continued)

OTHER PUBLICATIONS

David A. Patterson and John L. Hennessy, Computer Architecture A Quantitative Approach, 1996, Morgan Kaufmann Publishers, Second Edition, pp. 677-687 and 694-701.*

Primary Examiner—Reginald Bragdon
Assistant Examiner—Shawn X. Gu
(74) Attorney, Agent, or Firm—Carr LLP; D'Ann N. Rifai

(57) ABSTRACT

A system for cache coherency comprises a memory. The memory comprises a plurality of data items and a plurality of directory information items, each data item uniquely associated with one of the plurality of directory information items. Each of the plurality of data items is configured in accordance with one of a plurality of access modes. Each of the plurality of directory information items comprises indicia of the access mode of its associated data item. A multiplexer couples to the memory and comprises a multiplex ratio. A plurality of buffers couple to the multiplexer and to the memory. The multiplex ratio is a function of the number of buffers in the plurality of buffers. A plurality of multiplexer/demultiplexers (MDMs) each uniquely couple to a different one of the plurality of buffers. A plurality of processing elements couple to the memory; each of the processing elements uniquely couples in a point-to-point connection to a different one of the plurality of MDMs. Each of the processing elements is configured to transmit a data request to its associated MDM, the data request identifying one of the plurality of data items and an access mode. Each of the processing elements further comprises a prefetch page cache, the prefetch page cache configured to store a subset of the plurality of data items and the plurality of directory information items. The memory is configured to transmit a data response to each of the processing elements in response to a data request, the data response comprising the identified data item and its associated directory information. Each of the processing elements is farther configured to receive the data response and to compare the associated directory information with the access mode of the data request and in the event that the associated directory information and the access mode of the data request are not compatible, to initiate coherence actions for the requested data item.

21 Claims, 15 Drawing Sheets

U.S. PATENT DOCUMENTS

| | | | |
|---|---|---|---|
| 5,881,303 A * | 3/1999 | Hagersten et al. | 712/30 |
| 6,374,332 B1 * | 4/2002 | Mackenthun et al. | 711/145 |
| 6,587,931 B1 * | 7/2003 | Bauman et al. | 711/145 |
| 6,662,277 B2 * | 12/2003 | Gaither | 711/145 |
| 6,751,721 B1 * | 6/2004 | Webb et al. | 712/10 |
| 6,934,810 B1 * | 8/2005 | Williams et al. | 711/137 |
| 6,993,630 B1 * | 1/2006 | Williams et al. | 711/137 |
| 7,089,371 B2 * | 8/2006 | Hooker | 711/144 |
| 2003/0028730 A1 * | 2/2003 | Gaither | 711/141 |

* cited by examiner

METHOD AND APPARATUS FOR DIRECTORY-BASED COHERENCE WITH DISTRIBUTED DIRECTORY MANAGEMENT UTILIZING PREFETCH CACHES

CROSS-REFERENCED APPLICATIONS

This application relates to U.S. patent application entitled "A Method and Apparatus for Directory-Based Coherence with Distributed Directory Management" U.S. patent application Ser. No. 10/809,581 filed concurrently herewith.

TECHNICAL FIELD

The present invention relates generally to the field of multiprocessor computer systems and, more particularly, coherence implementation in a multiprocessor system.

BACKGROUND

A shared memory processor (SMP) consists of processor nodes and memories combined into a scalable configuration. Each node has one or more processors and its local memory. Optionally, each node has a cache and a cache controller for accessing main memory efficiently and enforcing consistency. However, a shared memory SMP differs from a network of workstations because all nodes share the same global address space. Hence, software techniques for mapping the global address space into local addresses are typically not needed in a shared memory SMP. A shared memory SMP also has fast interconnection networks that are used to access the distributed memory and pass consistency information. In some systems, the physical memory is distributed; these machines are referred to as non-uniform memory access [NUMA] machines. In an exemplary system, each processor in a node generally has a write-through first-level cache, and a write-back second-level cache. If there is more than one processor per node, cache coherence between processors must be maintained within a node in addition to between nodes. However, other types of machines other than NUMA machines also exist.

As access to main memory is slow compared to the processor speed, hardware caches are necessary for acceptable performance. However, since all processors (and caches) share the same global access space, it is possible that two different caches will cache the same data line (address) at the same time. If one processor updates the data in its cache without informing the other processor in some manner, an inconsistency results, and it becomes possible that the other processor will use a stale data value. The goal of cache coherency is to enforce consistency to insure proper execution of programs in this parallel environment.

There are at least two major factors affecting cache mechanisms: performance and implementation cost. The need for greater performance is obvious. The programs designed for shared memory multiprocessors have very long execution times so any performance increase would be beneficial.

If the time to access main memory is too slow, performance degrades significantly, and potential parallelism is lost. Implementation cost is also an issue because the performance must be obtained at a reasonable cost. Implementation costs occur by adding additional coherence hardware, or by programming consistency enforcing compilers. In addition to these two major factors, there are four primary issues to consider when designing a cache coherence mechanism. First is the coherence detection strategy, which is how the system detects possibly incoherent memory accesses. Second is coherence enforcement strategy. This is how cache entries change to guarantee coherence (that is, updating or invalidating). Third is precision of block-sharing information, which is how sharing information for cache and memory blocks are stored. Fourth is caches block sizes, which are the size of a line in the cache, and how it further affects system performance.

Custom DRAM chips (CDRAM) were introduced to eliminate some of these inherent problems. However, while CDRAMs can have extremely high bandwidth on dedicated busses, they often have no logic execution ability, increasing the coherency problem.

Therefore, there is a need for maintaining coherency in large caches in a manner that address at least some of the problems of conventional maintenance of coherency in very large caches.

SUMMARY OF THE INVENTION

A system for cache coherency comprises a memory. The memory comprises a plurality of data items and a plurality of directory information items, each data item uniquely associated with one of the plurality of directory information items. Each of the plurality of data items is configured in accordance with one of a plurality of access modes. Each of the plurality of directory information items comprises indicia of the access mode of its associated data item. A multiplexer couples to the memory and comprises a multiplex ratio. A plurality of buffers couple to the multiplexer and to the memory. The multiplex ratio is a function of the number of buffers in the plurality of buffers. A plurality of multiplexer/demultiplexers (MDMs) each uniquely couple to a different one of the plurality of buffers. A plurality of processing elements couple to the memory; each of the processing elements uniquely couples in a point-to-point connection to a different one of the plurality of MDMs. Each of the processing elements is configured to transmit a data request to its associated MDM, the data request identifying one of the plurality of data items and an access mode. Each of the processing elements further comprises a prefetch page cache, the prefetch page cache configured to store a subset of the plurality of data items and the plurality of directory information items. The memory is configured to transmit a data response to each of the processing elements in response to a data request, the data response comprising the identified data item and its associated directory information. Each of the processing elements is further configured to receive the data response and to compare the associated directory information with the access mode of the data request and in the event that the associated directory information and the access mode of the data request are not compatible, to initiate coherence actions for the requested data item.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

Figure 1:
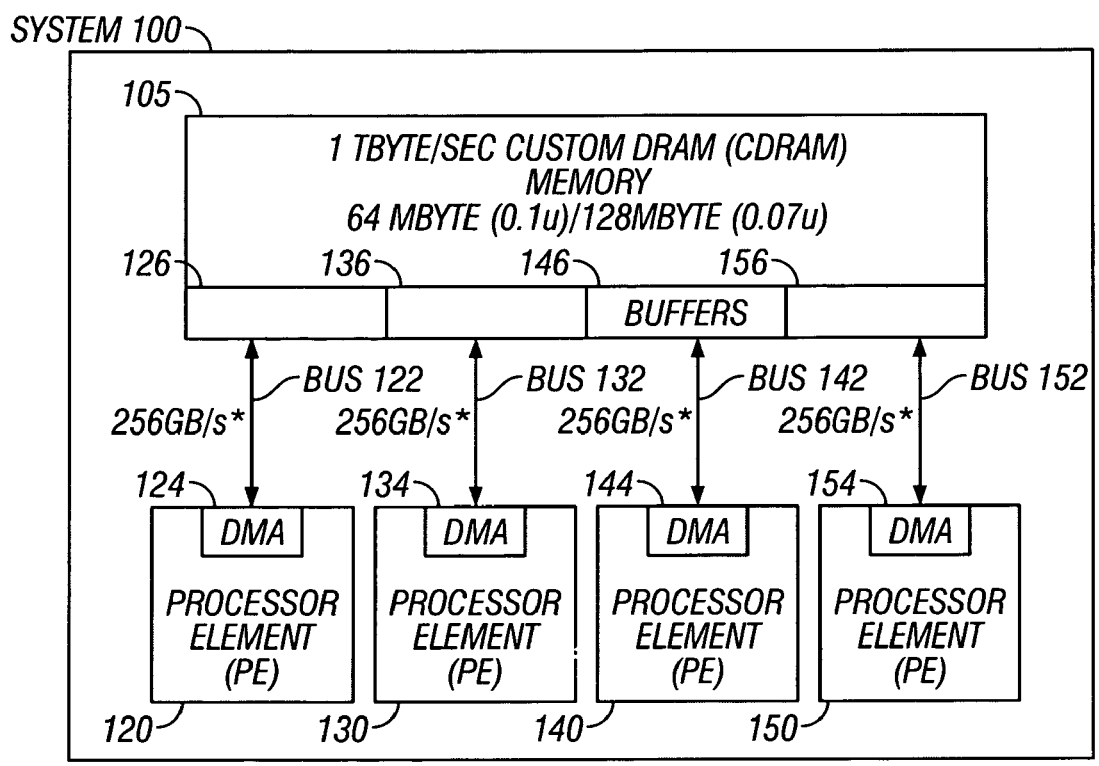
FIG. 1 illustrates an exemplary diagram of a high bandwidth SMP (symmetrical processor)

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In one embodiment, however, the functions can be performed by a processor, such as a computer or an electronic data processor, in accordance with code, such as computer program code, software, and/or integrated circuits that are coded to perform such functions, unless indicated otherwise. In the present specification, the same reference characters are used to refer to terminals, signal lines, and their corresponding signals.

Turning to FIG. 1, disclosed is an exemplary diagram of high bandwidth SMP (symmetrical processor) System 100. In such a System 100 with high bandwidth between a memory hierarchy level and a processing element, one or more processors constitute a portion of the SMP system.

The System 100 can apply to many alternative configurations of memory access systems, including a Non-Uniform Memory Access (NUMA) type system in which each processor has its own local memory but can also access memory owned by other processors. It is referred to as 'non-uniform' because the memory access times are faster when a processor accesses its own memory than when it borrows memory from another processor. NUMA computers offer the scalability of MPP (massively parallel processing, a type of computing that uses many separate CPUs running in parallel to execute a single program.

MPP is similar to symmetric processing (SMP). One main difference is that in SMP systems, all the CPUs share the same memory, whereas in MPP systems, each CPU has its own memory. MPP systems are therefore more difficult to program because the application must be divided in such a way that all the executing segments can communicate with each other. On the other hand, MPP systems do not suffer from the bottleneck problems inherent in SMP systems when all the CPUs attempt to access the same memory at once. MPPs retain the programming ease of SMPs or NUMA type systems, in that all CPUs in the system are subjected to the same latency and bandwidth restrictions with respect to accessing the system's memory and I/O channels. The CDRAM can be treated as a closer main memory to the processor elements (PEs) or as a level of the cache hierarchy.

To address the issue of coherency, additional coherence information is stored in an adjacent CDRAM directory. When a buffer is requested, the coherence directory bits are transferred with the associative line to the processing element (PE). If the PE determines the line is not available for a particular access mode, the PE initiates coherence action. In one embodiment, the CDRAM, using local logic (requiring minimal amounts of the logic) does this autonomously. In other embodiments, the updates can be made in programmable memory technologies or by the PE directly (with special attention given to stale line errors). In a preferred embodiment, a plurality of nodes each having at least one processor and a local cache hierarchy are connected to a shared system memory with point-to-point links. In these links, one side of the point-to-point links is attached to the shared system memory. The other side of the link is attached to at least one node comprising at least one processor. In one preferred embodiment, this memory is custom DRAM.

Further, according to the preferred embodiment, the system combines the uses of a passive system memory that consists of memory cells fabricated in a memory-optimized process. In a preferred embodiment, the point-to-point links attach directly to the memory chip, containing memory cells to reduce system cost. As memory is built in a memory-optimized process that is prioritized for low per-bit memory cost and high memory chip yield, the system memory does not have a directory controller associated to the system memory. In another embodiment, small amounts of logic can be present to perform simple operations. In an optimized embodiment, multiple copies of logic are present, arranged in a fuse selectable/programmable manner for redundancy, and increased CDRAM yield.)

In one embodiment, the point-to-point links are built by employing chip-stacking techniques. In one chip-stacking technique, C4 solder balls are used. In another embodiment of high-speed point-to-point links, optical interconnects are used. Other high-speed point-to-point links are used similarly in alternate exemplary embodiments.

Having thus described the system environment of the preferred embodiment, we now describe some preferred mode of operations. Since there is no directory controller having full functionality present in the system memory, a distributed directory control mechanism is employed. According to the preferred embodiment, each memory unit (being one of byte, word, double word, cache line, memory page, or other such memory block as appropriate) is associated with additional information. This information at a minimum indicates whether a specific memory unit has been requested and is in use by a processor (or node). In an optimized embodiment, additional information, for example, whether a processor has acquired the memory unit for exclusive or shared access is provided. In yet another embodiment there is provided additional information, such as which (one or more) processors have acquired a memory unit for either shared or exclusive use. In a preferred embodiment, directory information is not part of the normal memory space accessible by programs, but is "meta information" associated with each memory unit. In one embodiment, special means exists for software on a processor to access directory information.

When a node requests a memory unit by a request over the point-to-point link, the memory unit is returned with the additional information. The requested memory unit can be a superset (or subset) of the granularity in which memory units and information associated with them are stored in memory system. In addition, the information associated with the request is updated, for example, to indicate that a specific memory unit, for example, has been requested by a processor, possibly further indicating the mode, for example, in shared mode, and/or possibly indicating which processor (or node) has performed the request.

When the requested memory unit is returned to the requesting node (processor), the processor uses logic circuitry (or program controlled means), for example, in a memory flow controller, DMA controller, or CDRAM access controller, to test whether the information about the memory unit accessed is consistent with the desired/requested access mode.

For example, the processor, having requested a shared access and the returned memory unit indicating shared access by another process, the request is successful. In another operating sequence, the processor having requested shared access, and the returned memory unit being indicated as being in exclusive state, a resolution action is required.

The resolution action will perform coherence actions, for example, via a slower operation bus that connects one or more nodes, or by performing coherence action through a special message-passing protocol (for example, by raising a single protocol service request line, and depositing the requested coherence action in a known location, for example, in a specially designated storage facility, and preferably updates the information in system memory to indicate the new state after the coherence action has been performed.

In one aspect of this invention, the data size of transferred memory units exceeds the basic storage unit for coherence actions. When a node fetches a memory unit, it is cached in at least one page cache, together with all meta information. In the following description, we presume that the transfer size is a page: when a request can be satisfied from at least one local page cache, then no request to system memory is made.

To ensure correct protocol processing, additional protocol actions are possible. In one possible embodiment, the system memory stores the addresses of cached pages and appends them to each memory request. Cached pages may then be considered in shared (or exclusive) mode in particular variants of the protocol. When a page is evicted from the page cache, a directory information update is performed on blocks containing the page in system memory, to indicate all additional requests, which were made satisfied from the page cache, and not propagated to main memory. In addition, the address indicating the contents of a node's (processors) page cache is reset.

In an optimized embodiment, multiple actions can be combined in a single request, for example, resetting a page cache indicator in system memory, updating directory information for elements acquired from the page cache, and requesting a new page for the page cache.

As described, operations such as storing page cache addresses, directory information, and reading and writing data are all consistent with the functions performed by a memory chip. Further, some simple updates of meta information (but no coherence actions associated with the memory protocol), could be performed in one embodiment by simple logic integrated in system memory.

In FIG. 1, the design is of an SMP utilizing four separate nodes (120, 130, 140, and 150), each node containing at least one processor. According to the present embodiment, each node having at least one processor is termed "processing element," or PE.

Processing element (PE) 120 contains a memory interface controller 124, connected to a buffer BUF 126 by a bus BUS 122, such that the BUF 126 is linked to custom DRAM device CDRAM 105.

BUF 126 through BUF 156 are common buffer devices in that each node passing through (or a signal using a node) on BUS 122, bus is matched to a unique input (that is, the architecture designer has specified that every signal passing from the DMA controller to DRAM enter at a unique address on the buffer for processing in the DRAM).

Processing element PE 130 contains memory interface controller 134, connected to the buffer BUF 136 by a bus BUS 132, such that the BUF 136 is linked to custom DRAM device CDRAM 105. Processing element PE 140 contains memory interface controller 144, connected to the buffer BUF 146 by a bus.

The BUS 142 is configured in a manner such that the BUF 146 is linked to custom DRAM device CDRAM 105, and, processing element PE 150 contains memory interface controller 154, connected to the buffer BUF 156 by a bus BUS 152, such that the BUF 156 is linked to custom DRAM device CDRAM 105.

Using the described point-to-point links, memory units are transferred between processing elements and the custom DRAM. In one embodiment, the size corresponds to a cache line of 128 bytes. In another embodiment, the transfer unit is a memory page of 4 K bytes. In additional embodiments, other transfer sizes are used.

While in the course of the description, we refer to specific memory technologies, such as DRAM (dynamic random access memory), other memory technologies such as SRAM (static random access memory), MRAM, eRAM, or any other memory technology can be used.

Similarly, while our embodiments show the preferred use of specific microprocessor architectures, such as the high-performance PowerPC architecture, other architectures may be used.

Figure 2:
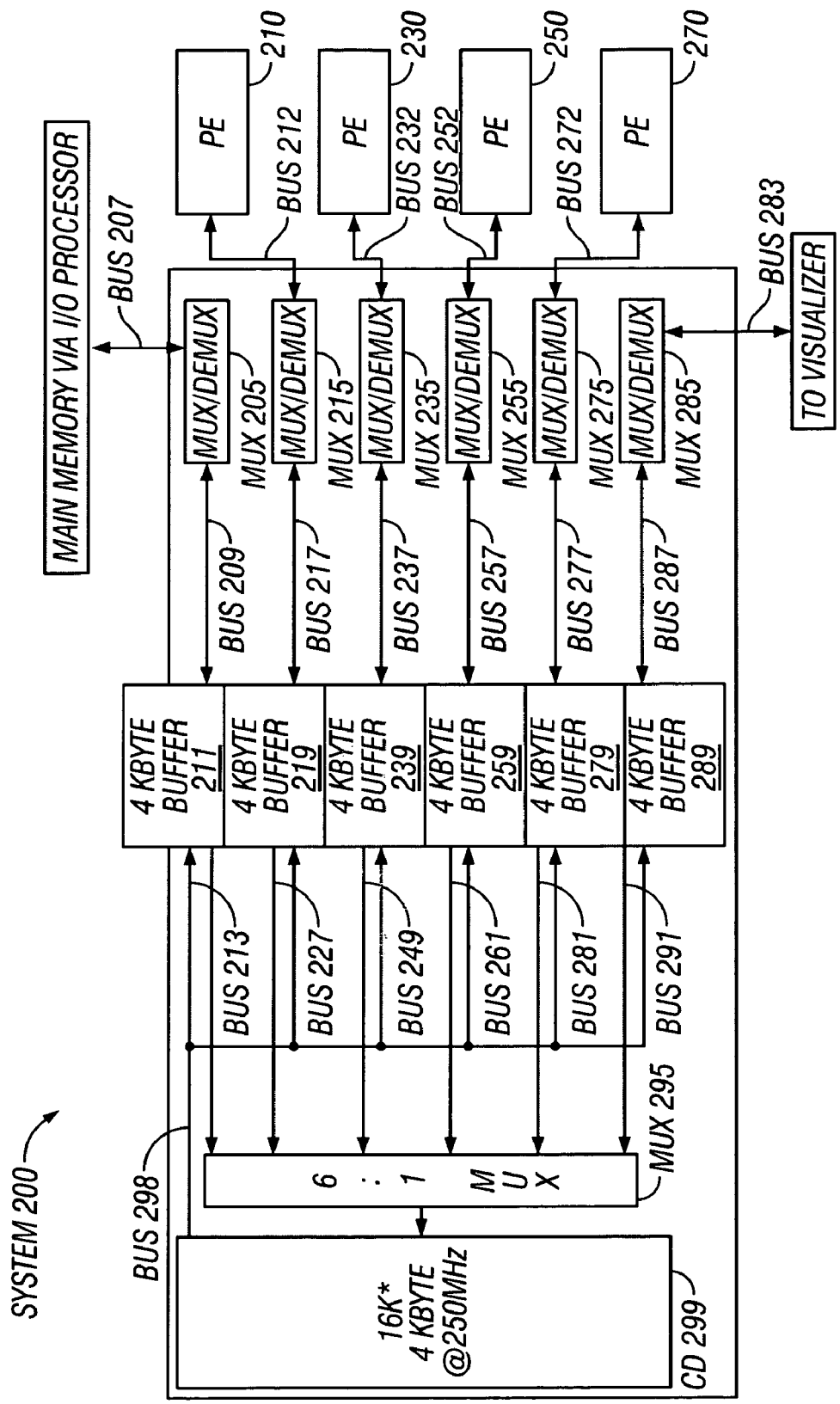
FIG. 2 illustrates an exemplary custom dynamic random access memory (DRAM) with a 6:1 multiplexer and associated buffers.

Turning now to FIG. 2, disclosed is an exemplary system diagram showing the use of an exemplary custom 64-megabyte DRAM with a 6:1 multiplexer and associated buffers in one exemplary system, and an exemplary interconnection detail.

This exemplary DRAM 200 is connected to four processing elements, PE 210, PE 230, PE 250, and PE 270. Each of the four PEs is connected to an adjacent multiplexer/demultiplexer by a point-to-point link. All links in this example are bi-directional links, multiplexing and de-multiplexing (that is, joining and separating) data signals according to a programming scheme.

PE 210 is attached to MUX 215 via BUS 212. PE 230 is attached to MUX 235 via BUS 232. PE 250 is attached to MUX 255 via BUS 252 and PE 270 is attached to MUX 275 via BUS 272. Similarly, in one exemplary embodiment, external memory is optionally connected to the system via an I/O processor (not shown, and not limited to a single main memory or single I/O processor), via BUS 207 to MUX 205. Likewise, in one exemplary embodiment, BUS 283 optionally conducts signals between MUX 285 and a visualizer or other I/O devices (not shown for clarity). (A visualizer is the interface to a graphics display device.)

Each MUX/DEMUX is paired with its own buffer. That is, in one embodiment, the visualizer has a buffer of 4K byte, BUF 289, connected via a link BUS 287. The I/O processor has a buffer of 4K byte, BUF 211, connected via a link BUS 209. MUX 205-MUX 285 are connected to their respective buffers BUF 211-BUF 289 via links BUS 209-BUS 287.

Subsequently, each buffer BUF 211, BUF 219, BUF 239, BUF 259, BUF 279 and BUF 289 feeds a 6:1 reduction multiplexer MUX 295 through dedicated busses BUS 213, BUS 221, BUS 241, BUS 261, BUS 281, and BUS 291. The rate then can differ in coherence speed from memory array 299 at full bus speed on BUS 298 (in the return loop), as the buffer busses drive data through to the MUX 295 to memory array 299 via the MUX bus, BUS 295. There may be more or less buffers, so any size MUX is possible from 1:1 to 1:N.

Coherence is achieved by maintaining additional coherence information in memory array 299. When a 4K byte buffer is requested, the coherence directory bits transfer together with a line, until receipt at the PE, where the PE determines if the line is available for a particular access mode, and if not available, performs appropriate coherence actions. In one embodiment, this involves serial transmission of buffer data from buffers 219, 239, 259, 279 via links 212, 232, 252, 272 to PEs 210, 230, 250, and 270. In another embodiment, parallel transfers occur.

Figure 3:
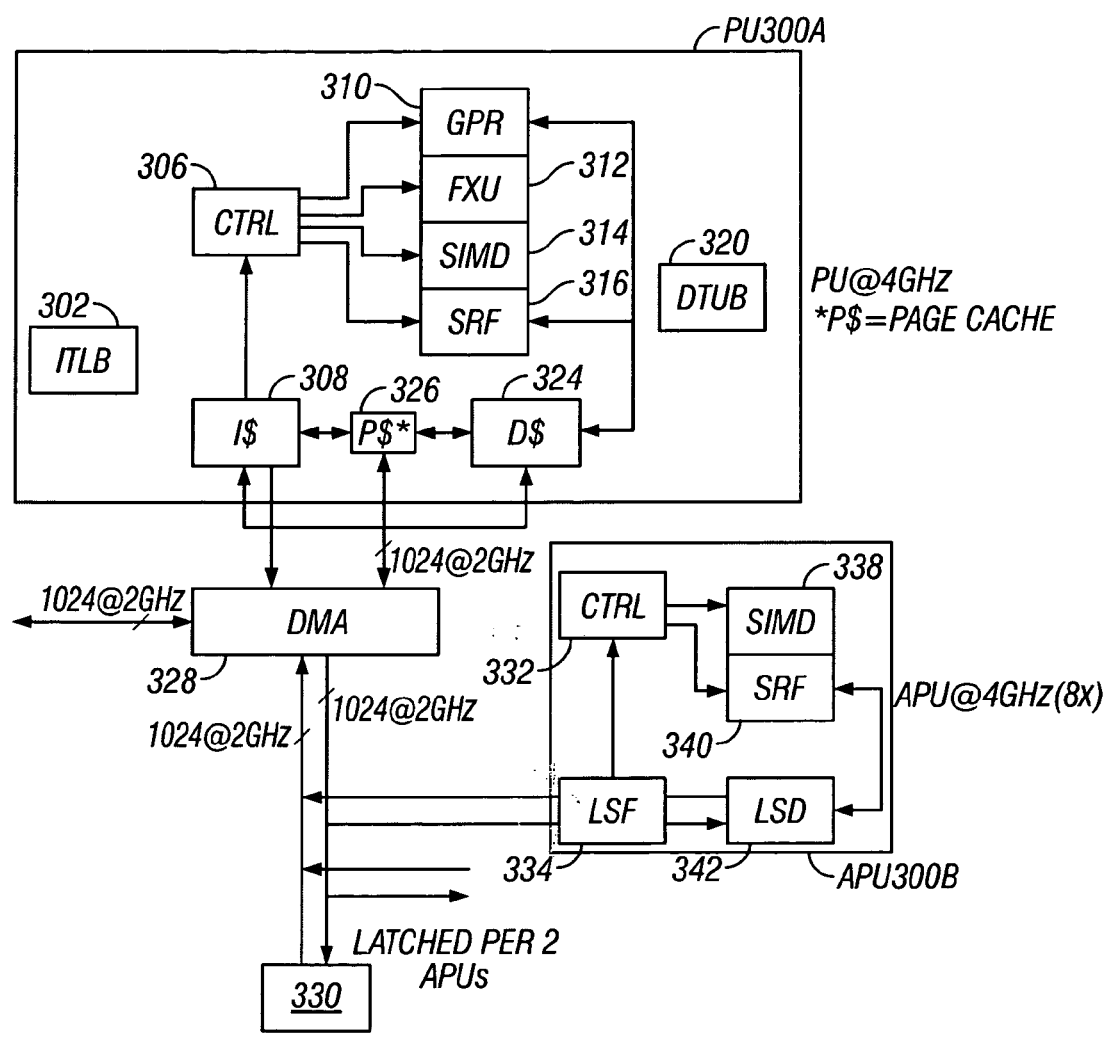
FIG. 3 illustrates an exemplary processing unit and auxiliary processing unit interconnection detail.

Turning to FIG. 3, disclosed is an exemplary processing element PE, consisting of a memory interface controller (DMA 328), at least one Processing Unit (PU 300A) and optionally at least one Auxiliary Processing Unit (APU 300B). FIG. 3 additionally provides interconnection detail connecting the memory interface controller to PU and APU units. The PU consists of a typical set of function blocks, optionally including, but not limited to, an Instruction Translation Look-aside Buffer (ITLB 302), Instruction Cache (I$ 308), Control Logic (CTRL 306), General Purpose Register File (GPR 310), Fixed Point Unit (FXU 312), Single Instruction-Multiple Data (SIMD) processing unit (SIMD 314), SIMD Vector Register File (SRF 316), Data Translation Look-aside Buffer (DTLB 320), Data Cache D$ 324, and, optionally, a page cache P$ 326; and within the APU 300B, control logic CTRL 332, SIMD processing unit 338, SIMD vector register file 340, Data Local Store (LSD 342), Instruction Local Store (LSI 334). In one alternative embodiment, the memory management and translation functionality (such as ITLB 302 and DTLB 320) are contained in memory interface controller 328. (In one embodiment, this memory interface controller is referred to by the name DMA controller. In yet another embodiment, this memory interface controller is referred to by the name memory flow controller.)

When a line is evicted from the cache hierarchies in the PE 210 through PE 270 of FIG. 2, the coherence directory can either be updated immediately (at additional transaction cost when the line is freed), or updated in a lazy manner, when a remote PE requests a line which is no longer present (at a transaction cost penalty for the requesting PE when the line is requested).

In an additional optimization, the disclosed system contains a prefetch page cache P$ 326 in each PE. Then, in one implementation, the page cache caches information from the custom memory array. In a further implementation, the P$ 326 is managed in accordance with the described invention, that is, when the P$ 326 is prefetched, it is requested from remote processors and coherence information is updated in the CDRAM directory.

When a later page fetch overwrites the P$ 326, the coherence entries are updated either immediately, or with delay. However, given the coarse-grained nature of the P$ 326 prefetching, and its speculative behavior, a penalty can result from a number of aspects.

For example, a penalty can occur when P$ 326 sub-lines are requested from remote PEs, but are never used by the requesting PE. This can occur due to false sharing on a CDRAM line basis, and given the coarse nature of the CDRAM line may be common for many applications that have not been optimized for this environment. Updates to the coherence directory may be frequent due to request and release of successive memory units. The first issue can be solved by providing the P$ 326 with those sub-lines that are available and need not be requested using coherence actions. Thus, prefetch is only performed on available lines, reducing the cost of false sharing. In an optimized embodiment, predictors might be used to determine if certain sub-lines, which are not available, should be requested, while identifying other sub-lines, which are not subject to requests, by the P$ 326 file mechanism.

The second issue is resolved by adding a small set of P$ 326 tags that are transmitted with each requested line; a line is then available if it is not marked as used in the coherence directory, nor the P$ 326 tags. In another embodiment, the P$ 326 tags are compared in the CDRAM and the transmitted coherence bits represent the union of directory coherence bits and the P$ 326 tags.

A P$ 326 tag is overwritten by the new P$ 326 tag when a new prefetch page request is issued by a PE (in one embodiment, if multiple lines can be prefetched and maintained in the P$ 326, the line which is replaced is specified in the request).

Another embodiment results in the coherence directory in the CDRAM updating for each sub-line being transferred to I$ 308 or D$ 324. In another embodiment, these updates only occur when a P$ 326 page is evicted from the P$ 326. In some embodiments the P$ 326 will be obtained for read-only access, and explicit bus transactions will be generated for promotion to write access. In other implementations, the P$ 326 entries can be obtained also for write access, depending on the nature of the initiating request. In the latter case, information about shared/exclusive access will be maintained with the P$ 326 tag in the CDRAM.

Figure 4:
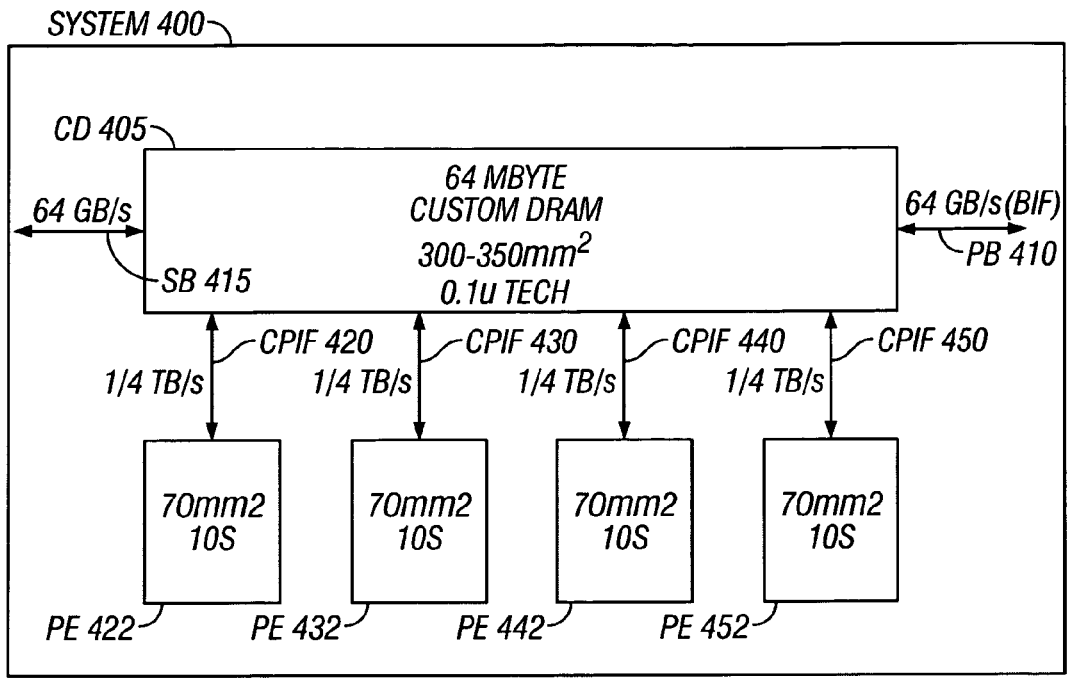
FIG. 4 illustrates an exemplary idealized custom cDRAM processing element configuration comprising four processors.

Turning to FIG. 4, disclosed is an exemplary ideal processing element configuration comprised of four processors. In the SYSTEM 400, a 64 megabyte CDRAM CD 405, approximately of 300 mm² dimensions, and built on 0.1 μ level technology, receives/sends data through a system bus SB 415 at an inferred target rate of 64 gigabytes per second (GB/s).

CD 405 also receives/sends indicia through a bus PB 410 at the same inferred target rate, to external I/O (BIF) ports. Resident and transient data is processed independently by PEs, PE 422, PE 432, PE 442 and PE 452, each with its own bi-directional CDRAM to Chip Stacked Ports (CPIF), CPIF 420, CPIF 430, CPIF 440 and CPIF 450, all operating at an inferred rate of ¼ terabyte that is, [250 gigabytes] per second (A terabyte is a measure of computer storage capacity and is 2 to the 40th power or approximately a thousand billion bytes—that is, a thousand gigabytes). Each PE device is of approximately 70 mm² dimensions and uses 0.10 micron SOI [silicon-on-insulator] Process Technology (CMOS 10S) [a proprietary technology developed by IBM].

Figure 4A:
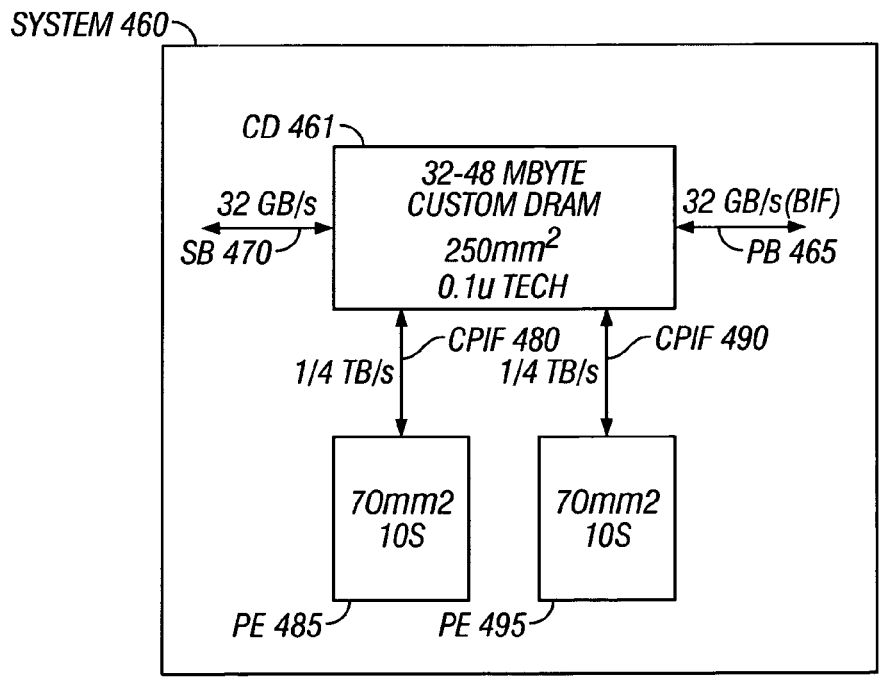
FIG. 4A illustrates an exemplary custom cDRAM embodiment of a processing element configuration for two processing elements.

Turning to FIG. 4A, disclosed is an alternative embodiment of a processing element configuration in SYSTEM 460. The controlled collapse chip connector (C4) ball grid used to make the device connections in FIG. 4 is limited to fifteen total connections, so as an alternative, FIG. 4A presents a two PE (processor element) configuration, wherein the interconnected devices function similarly, at ½ of the ideal bus speeds proposed in FIG. 4.

Figure 5:
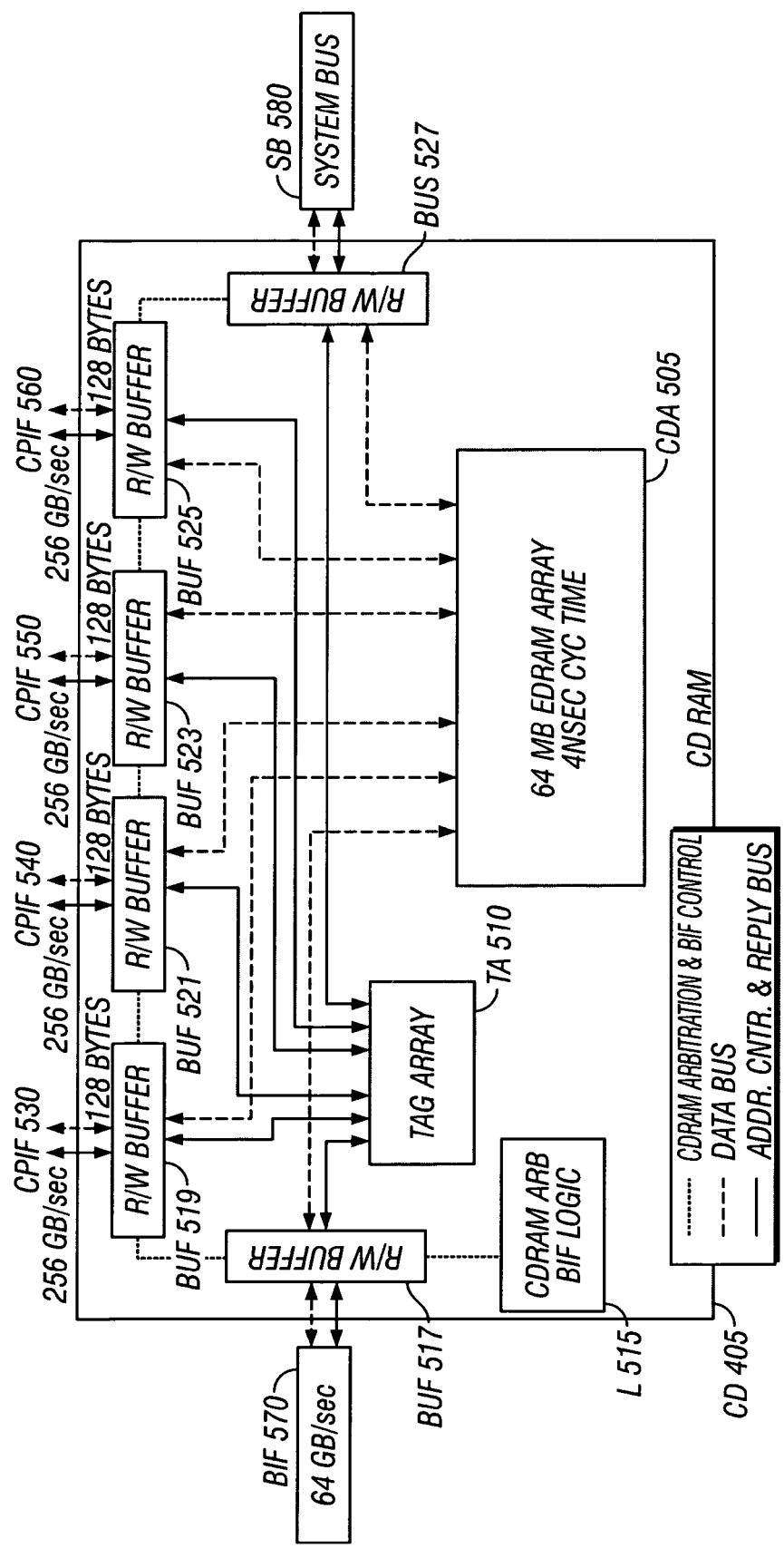
FIG. 5 illustrates an exemplary CDRAM concept summary process flow diagram.

Turning to FIG. 5, disclosed is an exemplary CDRAM concept summary process flow diagram of DEVICE 400 from FIG. 4. In this example, a custom DRAM of 64 MB is disclosed, however, a 32 MB configuration, or a 128 MB configuration could have a similar layout. The implementation is not limited to a particular bandwidth, resting more on the practical technical aspects of implementing smaller and smaller device architectures. Furthermore, the CDRAM can comprise more or less elements than those described herein, and the layout is diagrammatic, only.

Resident on the DEVICE 500 custom DRAM is a 64 MB EDRAM array with four nanosecond cycle time, CDA 505 (Enhanced Dynamic Random Access Memory). EDRAM is dynamic random access memory (dynamic or power-refreshed RAM) that includes a small amount of static RAM (SRAM) inside a larger amount of DRAM so that many memory accesses will be to the faster SRAM. EDRAM is sometimes used as L1 and L2 memory and, together with Enhanced Synchronous Dynamic DRAM, is known as cached DRAM. L1 and L2 refer to the levels of memory or cache and the physical proximity to the processor. The higher the number, the further from the processor core, generally.

Adjacent is a tag array TA 510, a CDRAM arbitrator with BIF logic L 515, and read/write buffers as follows. BUF 517 under control of CDRAM Arbitrator L 515 reads and writes data at 64 GB/sec to BIF 570. Buffer BUF 519 feeds CPIF 530 under control of tag array TA 510 and data feed from CDA 505. On the system bus side of DEVICE 500, buffer BUF 527 performs a similar function. Likewise, CPIF 540 sends and receives data through BUF 521, CPIF 550 through BUF 523 and CPIF 560 through BUF 525.

The primary results of this schema are preventing memory bank conflicts (so no resources are needed for conflict resolution), division of data tasking such that one CPIF or BIF "owns" the entirety of the CDRAM each 4 nanoseconds, the first critical line receives first access and processing, and in the event of a single event upset (SEU), the system has redundant data and control paths to continue processing.

There is now set forth another exemplary embodiment, utilizing the instruction set of the previously described preferred embodiment. According to this exemplary embodiment, there are at four nodes connected to a shared memory hierarchy level via point-to-point links, the links providing means for requesting data for immediate processing or local storage in a cache for future processing. Each node consists of at least one processor. In one embodiment, each node is a heterogeneous system, consisting of at least one processing unit and one auxiliary processing unit. In another embodiment, there is provided a heterogeneous SMP, wherein some nodes have at least one first processing unit and other nodes have at least one second processing unit (such as an auxiliary processing unit).

Figure 6:
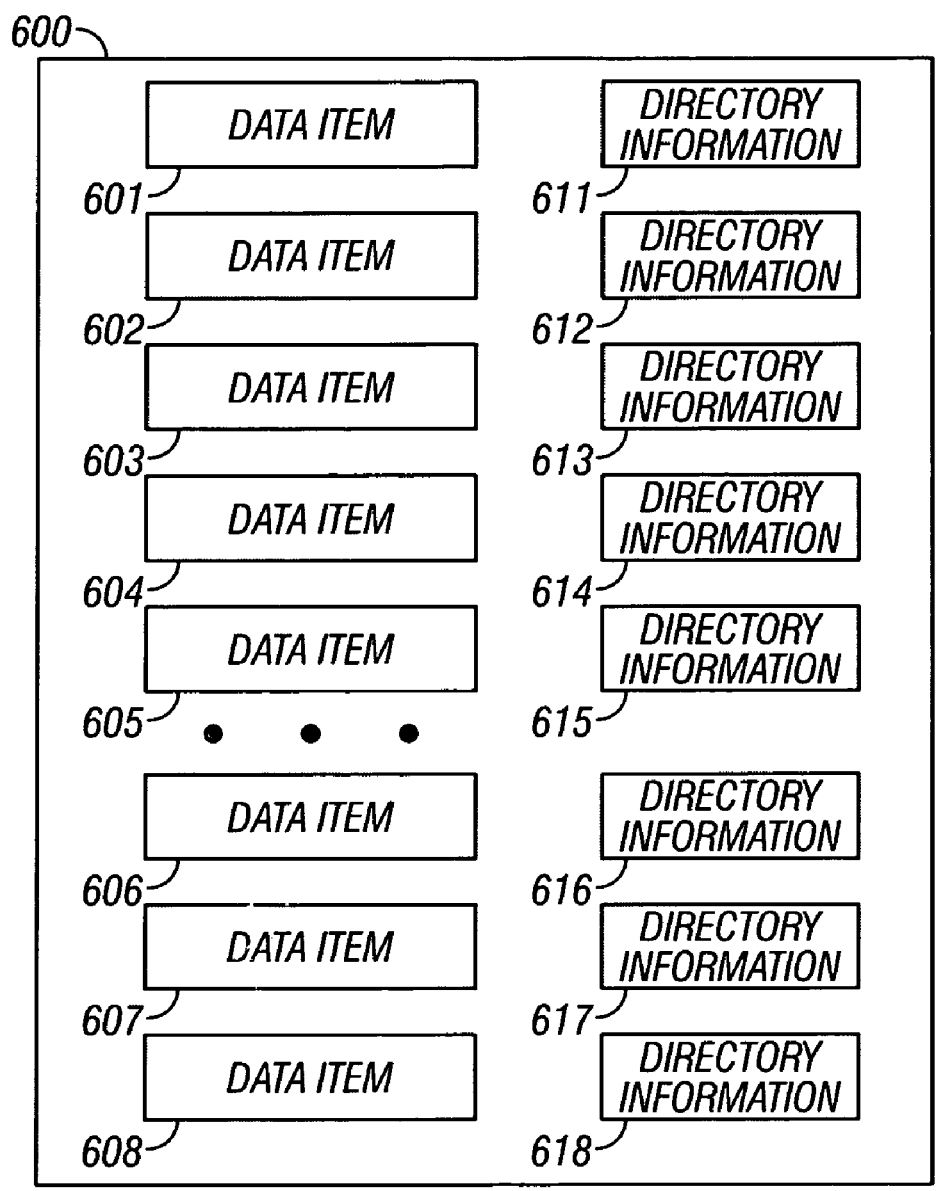
FIG. 6 illustrates an exemplary DRAM datagram comprising data and directory information.

Turning now to FIG. 6, disclosed is a shared memory hierarchy level 600 containing at least a plurality of data items 601-608 of system-specific granularity (for example, a word, a double word, a quad word, cache line, a memory page, or similar data item).

Associated with each data item there is provided directory information 611-618 at least describing the sharing state of each data item associated with the directory information. In one embodiment, the shared memory hierarchy level is a level of cache backed by external memory, and other cache management data is optionally stored, such as those including but not limited to tags, dirty bits, valid bits, and so forth. In another embodiment, the memory hierarchy level 600 is the system memory. In one embodiment, the unit of transfer from the memory array is a data item. In another embodiment, the unit of transfer consists of a number of bits selected from the memory item. In yet another embodiment, the transfer unit consists of a plurality of data items, such as for example, a page. When practicing the preferred embodiment, the memory array can be addressed using one of many address formats: virtual, segmented, relative, absolute, physical, effective, or any other such address format as can be used to access memory.

In one embodiment, shared memory hierarchy level 600 optionally supports a set of operations on the directory information, and prefetch address registers, such as read, write, and a limited set of logical operations, to facilitate the execution of coherence actions and update of directory information in accordance with coherence actions being preformed.

Figure 7:
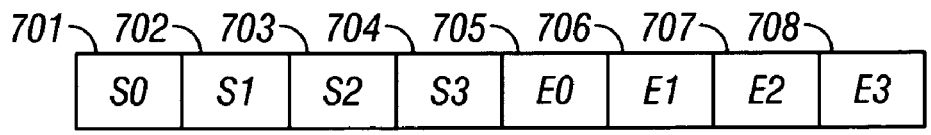
FIG. 7 illustrates an exemplary directory datagram displaying node states.

Referring now to FIG. 7, shown is exemplary directory information stored in directory information 611-618 associated with data items 601-608. In a first way of representing directory information, there is provided a bit vector, the bit vector using bits of information associated with each node to indicate whether the node has acquired a specific data item. In another aspect of this encoding, two bits are provided for each node, indicating for each processor whether the processor has acquired a data item for shared access (bits 701, 702, 703, 704 corresponding to a first, second, third and fourth node), or for exclusive access (bits 704, 705, 706, 708 corresponding to a first, second, third and fourth node).

Figure 7A:
FIG. 7A illustrates an embodiment of exemplary directory state format.

Referring now to FIG. 7A, there is provided an exemplary encoding of directory information stored in directory information 611-618 associated with data items 601-608 according to in another preferred embodiment of directory information. According to this encoding, provided is a means 709 to indicate whether a line is in one of three states: resident, shared, exclusive. In one logical encoding of these three states, 2 bits may be used assigning bit combinations to each state, for example resident (00), shared (01), and exclusive (10).

The embodiments set forth in FIGS. 7 and 7A are exemplary, and other encodings can be practiced in conjunction with the preferred embodiment.

Figure 7B:
FIG. 7B illustrates an exemplary datagram displaying a protocol request.

Referring now to FIG. 7B, there is shown an exemplary protocol request from a node to shared memory hierarchy level 600, which consists of an optional request header 710 (which may optionally include—but is not limited to—a request sequence number, transaction number, CRC, and so forth), the requested memory address 711, and the requested memory access mode 712 (in one embodiment, one of shared and exclusive modes).

Figure 7C:
FIG. 7C illustrates an exemplary datagram displaying a protocol response.
Figure 8:
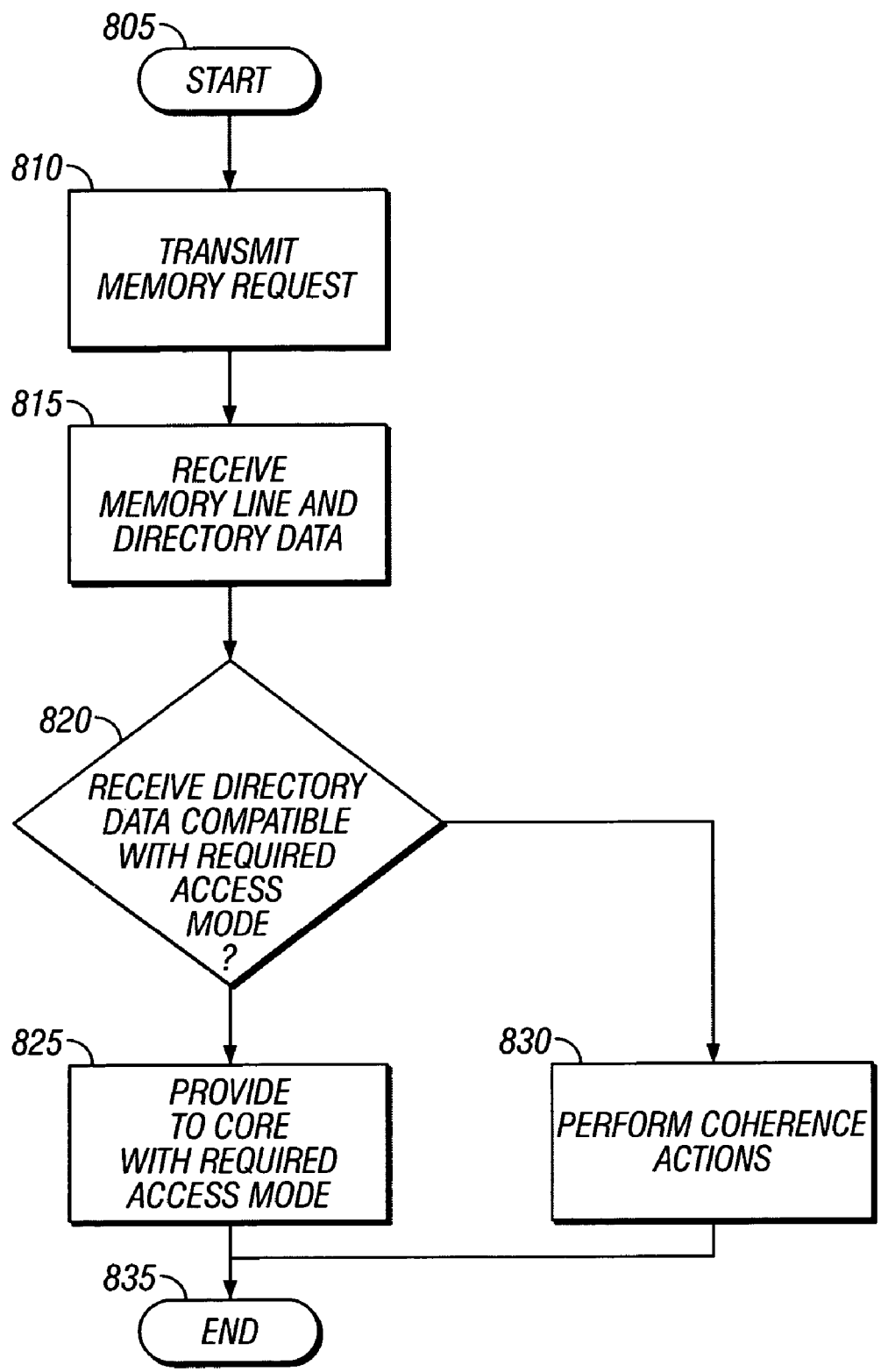
FIG. 8 illustrates an exemplary block diagram displaying a basic method for accessing custom DRAM.

Referring now to FIG. 7C, there is shown an exemplary protocol response from a shared memory hierarchy level 600 to a requesting node, which consists of an optional response header 713, which may optionally include—but is not limited to—a response sequence number, transaction number, memory address, CRC, etc., the requested data packet 714, containing a subset of a data item 601-608, or exactly one data item 601-608, or a plurality of data items 601-608, and a copy of associated directory information of at least one directory information entry 611-618, preferably before an update 820 in accordance with the method of FIG. 8 has been made.

Figure 8A:
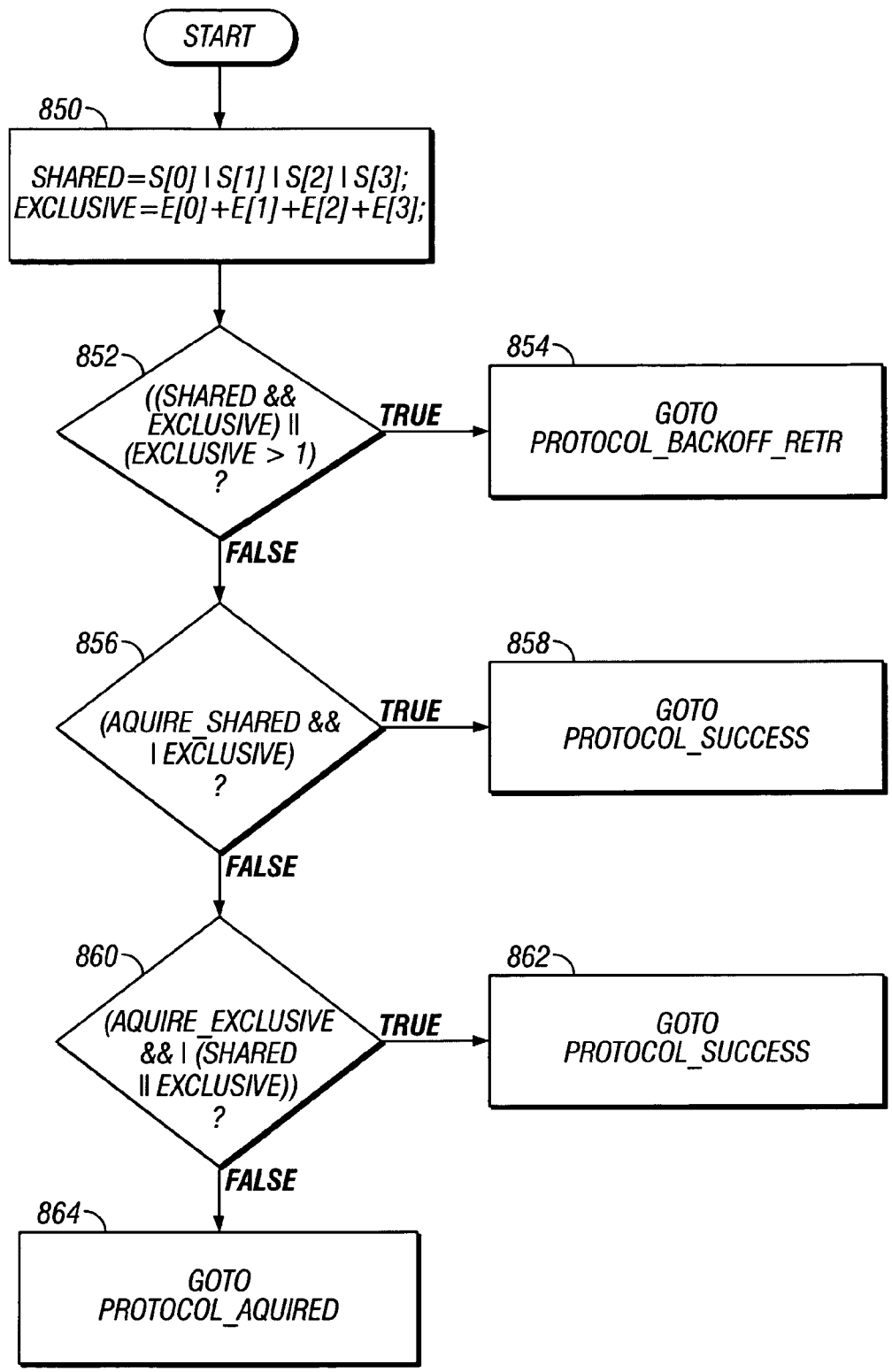
FIG. 8A illustrates a first exemplary implementation for testing if obtained data directory information is compatible with the requested access mode.
Figure 8B:
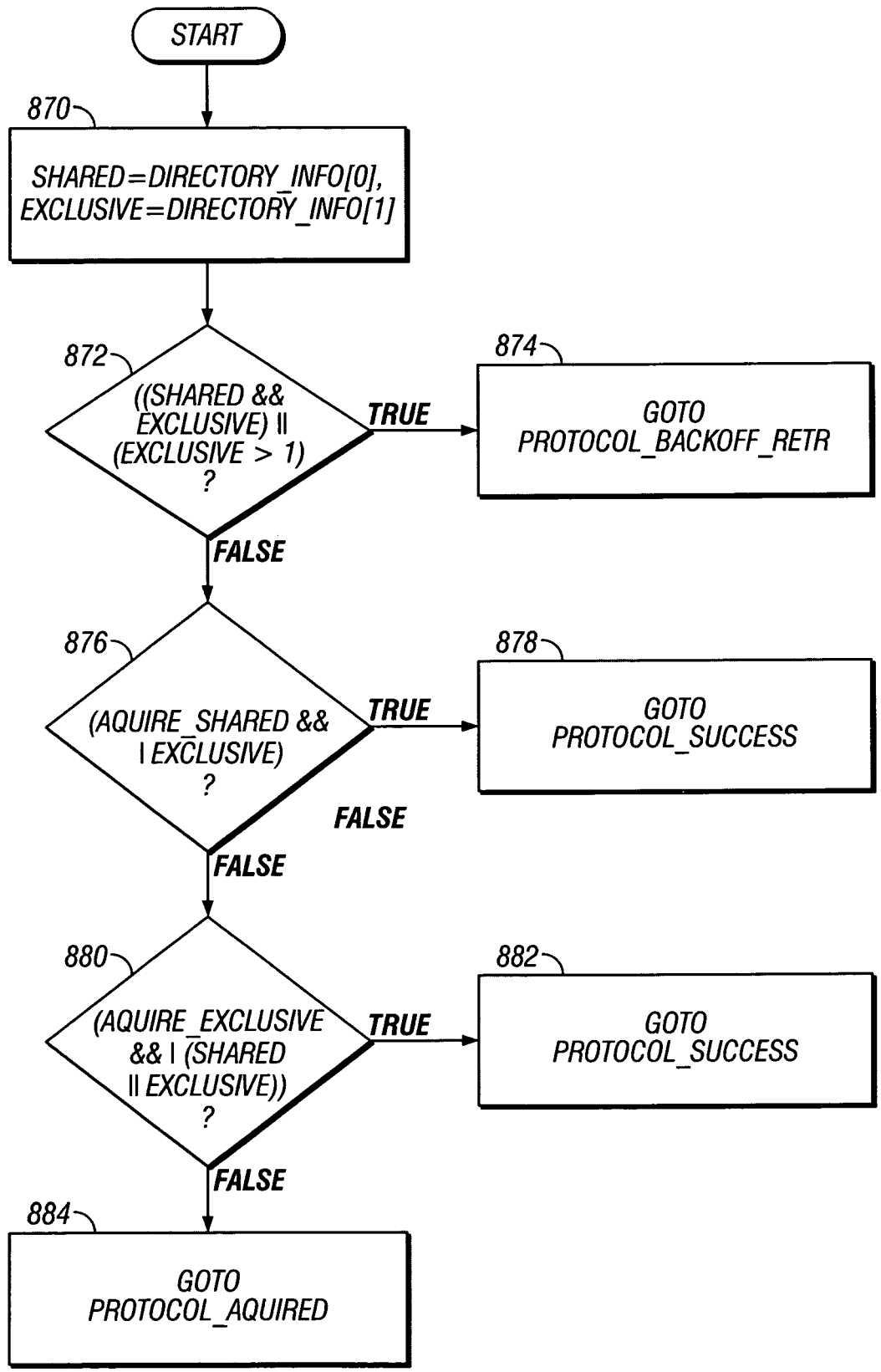
FIG. 8B illustrates a second exemplary implementation for testing if obtained data directory information is compatible with the requested access mode.

Referring now to FIG. 8, there is shown an exemplary method executed on at least one node to obtain data from a shared memory hierarchy level 600. According to this method, a first step 810 transmits a memory request to shared memory hierarchy level 600, preferably in, but not limited to a format such as described by FIG. 7B. In a next step 815, a response to the request is received from the shared memory hierarchy level 600, preferably in, but not limited to, a format such as described by FIG. 7C. In step 820, there is performed a test to determine if the directory information received in conjunction with requested data items is compatible with the required access mode. Two exemplary embodiments for test 820 are shown in FIGS. 8A and 8B. If step 820 determines that the requested data has been successfully retrieved from shared memory hierarchy level 600 with permissions that are compatible with the requested access mode, it is provided to at least one processor core in the node for either processing or storage with the requested access mode. If the step 820 determines that the provided directory information is not compatible with the requested access mode, step 830 is entered and coherence actions are performed to obtain data items with the requested permission. Coherence actions 830 for the purpose of this disclosure are all steps designed to obtain data items with appropriate access modes.

In one embodiment, this includes using a (possibly slower) coherence bus provided. In another preferred embodiment, this involves operations performed in a dedicated state machine, microcode, millicode, firmware, or software. In one embodiment, the coherence bus is a physical multi-drop coherence bus, in a further embodiment, the coherence bus is a logical coherence bus composed of multiple point-to-point links. In yet another embodiment there is provided a coherence ring. In other embodiments, coherence actions use special signaling primitives between nodes provided by the system (such as, including but not limited to, processor to processor interrupts), or a messaging and signaling system provided in the memory. Eventually, coherence actions obtain the data with the required access mode and provide them to at least one processor core in the node for either processing or storage with the requested access mode.

It is noted that this basic method of FIG. 8 has been described with respect to an exemplary functional flow, but does not describe error handling, time out conditions, receipt of incorrect packets, receipt of packets with inconsistent directory information and so forth, to lay out the basic functionality of the method.

Referring now to FIG. 8A, there is shown a method to implement step 820 of FIG. 8, in conjunction with directory information format of FIG. 7.

In a first step 850, the shared and exclusive conditions are determined. (Specific bits in this format are used to perform efficient coherence actions, but are not necessary for the execution of step 820.) In step 852, a first test is performed to determine if the directory information has a legal form. (In some embodiments, special directory entry values not corresponding to a legal coherence state may indicate a pending resolution of an access conflict.). If not, control transfers to step 854 which invokes special condition handling mechanisms implemented in conjunction with FIG. 8, such as error handling, and protocol retry. This condition may be detected for example when a pending resolution of an access conflict (using coherence actions 830 in the nodes) between two other nodes is in progress.

In step 856, a second test is performed to test if the data items are required in shared mode, and are not in exclusive mode. If so, success is indicated in step 858. This is possible because acquiring in shared mode is compatible with other states except exclusive state.

In step 860, there is performed a third test, to see if the data can be successfully acquired in exclusive mode, that is, the directory information does not indicate any use in shared or exclusive mode. If so, step 862 indicates success. This is possible because acquiring data items in exclusive mode is compatible with memory-resident state only, but not when data are maintained in any state in another node.

Otherwise, coherence actions are necessary, and this is indicated in step 864. This is necessary because the requested mode is not compatible with the state of the data item as indicated in the supplied directory information.

Referring now to FIG. 8B, there is shown a method to implement step 820 of FIG. 8, in conjunction with directory information format of FIG. 7B.

In a first step 870, the shared and exclusive conditions are determined. (Specific bits in this format are used to perform efficient coherence actions, but are not necessary for the execution of step 820.) In step 872, a first test is performed to determine if the directory information has a legal form. If not, control transfers to step 874 which invokes special condition handling mechanisms implemented in conjunction with FIG. 8, such as error handling, and protocol retry. In step 876, a second test is performed to test if the data items are required in shared mode, and are not in exclusive mode. If so, success is indicated in step 878. In step 880, there is performed a third test, to see if the data can be successfully acquired in exclusive mode, that is, the directory information does not indicate any use in shared or exclusive mode. If so, step 882 indicates success. Otherwise, coherence actions are necessary, and this is indicated in step 884. The statements associated with these calls are as follows.

Figure 9:
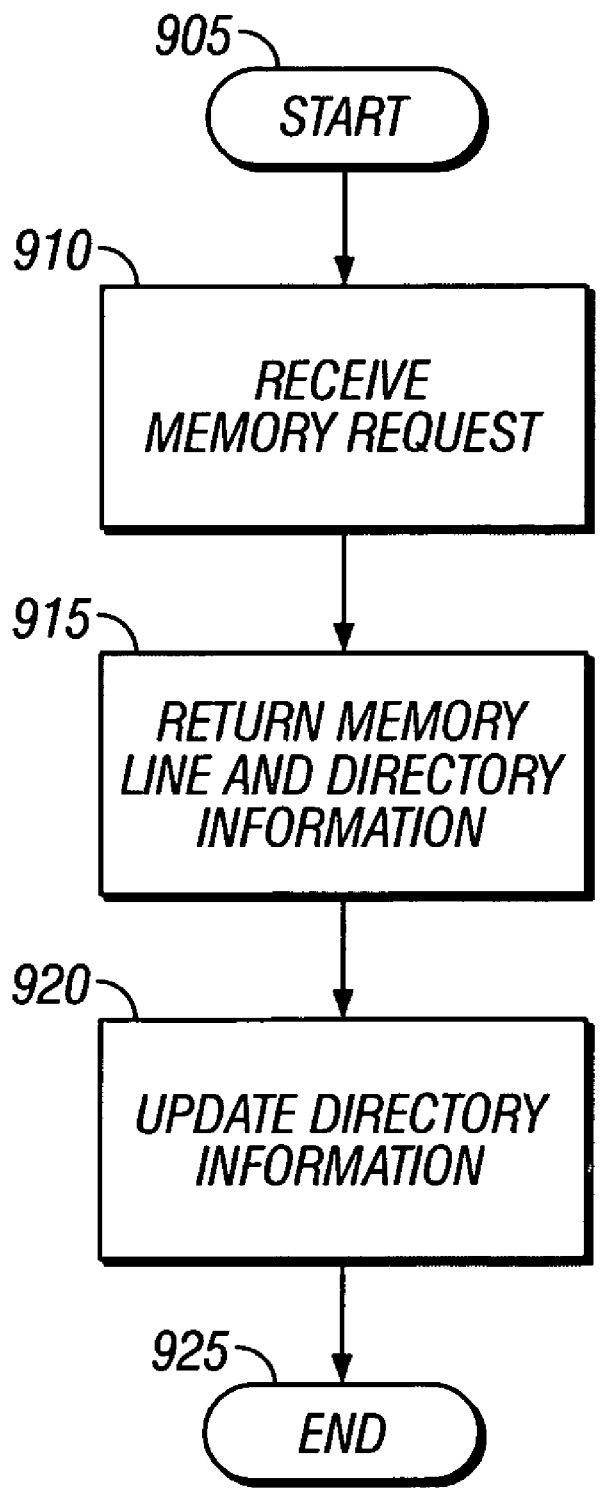
FIG. 9 illustrates an exemplary block diagram displaying another embodiment for accessing custom dynamic DRAM atomically.

Referring now to FIG. 9, there is shown an exemplary method implemented by the shared memory hierarchy level 600. In a first step 910, the shared memory hierarchy level 600 receives a request, for example, as described by the exemplary FIG. 7B, over a point-to-point link from a node.

In a second step 915, the requested data item 601-608 (or a subset from requested data item, or a plurality of data items containing the data item) are returned to the requesting node, in conjunction with the directory information state 611-618 associated with those data items being transferred. In another step 920, directory information is updated. Steps 915 and 920 are preferably implemented atomically with respect to other protocol transactions, in particular to other execution instances of steps 915 and 920 on behalf of other nodes. According to one exemplary embodiment, the directory update 920 is performed on directory information in accordance with FIG. 7B is in accordance with the following logic expressions:

directory_info[0]=directory_info[0] OR request.exclusive directory_info[1]=directory_info[1] OR request.shared wherein the subscription operator [I] indicates the bit numbered I of a bit vector, the operator=indicates assignment, and the operator OR corresponds to the logical OR of two Boolean values. The variables request.exclusive and request.shared indicate whether the request was for shared or exclusive access mode. In another embodiment, the request is indicated by a single bit.

The Boolean operations outlined above are of high simplicity and consistent with operations which can be performed on a memory-optimized process technology. According to another embodiment, there is provided an improved Boolean update logic, which implements the following logic expressions:

directory_info[0]=(directory_info[0] OR request.exclusive) AND NOT directory_info[1]

directory_info[1]=(directory_info[1] OR request.shared) AND NOT directory_info[0]

wherein the AND operator corresponds to the logic AND of two Boolean values, and the NOT unary operator inverts a Boolean value. This optimization ensures that directory information never enters an illegal state, and simplifies the handling of step 820 in accordance with the method of FIG. 8, and in particular step 872 of FIG. 8C.

According to one exemplary embodiment, the directory update 920 is performed on directory information in accordance with FIG. 7C is in accordance with the following logic expressions:

E[request.node]=request.exclusive;

S[request.node]=request.shared;

wherein the subscription operator [I] indicates the bit numbered I of a bit vector, and the operator=indicates assignment. The variables request.exclusive and request.shared indicate whether the request was for shared or exclusive access mode, and request.node indicates the number of the requesting node. In another embodiment, the request is indicated by a single bit.

Again, the Boolean operations outlined above are of high simplicity and consistent with operations which can be performed on a memory-optimized process technology. According to another embodiment, there can be provided improved Boolean update logic to simplify processing of step 820 of FIG. 8, and in particular 852 of FIG. 8B are possible.

Yet another implementation, according to one exemplary embodiment, the directory update 920 performed on directory information in accordance with FIG. 7C is in accordance with the following logic expressions employing an encoding known as "one-hot", thereby eliminating the need of performing an indexing operation [I]:

E[0]=E[0] OR request.exclusive[0];

E[1]=E[1] OR request.exclusive[1];

E[2]=E[2] OR request.exclusive[2];

E[3]=E[3] OR request.exclusive[3];

S[0]=S[0] OR request.shared[0];

S[1]=S[1] OR request.shared[1];

S[2]=S[2] OR request.shared[2];

S[3]=S[3] OR request.shared[3];

In one embodiment, redundant copies of described logic are provided in the memory chip, the redundant copies being selectable (for example, including for the purpose of, but not limited to, increasing yield).

There is now set forth another exemplary embodiment of the preferred embodiment, according to the instruction set of the preferred embodiment. According to the exemplary embodiment, there are four nodes connected to a shared memory hierarchy level via point-to-point links, the links providing means for requesting data for immediate processing or local storage in a cache for future processing. Each node consists of at least one processor. In one embodiment, each node is a heterogeneous system, consisting of at least one processing unit and one auxiliary processing unit. In another embodiment, there is provided a heterogeneous SMP, wherein at least one node has at least one first processing unit, and at least one node has at least one second processing unit (such as an auxiliary processing unit). According to this embodiment, there is supported prefetching capability. In one embodiment, a page containing a data item is prefetched. In another embodiment, other sequences of data items are prefetched. For making the features of this invention apparent, we will describe the embodiments in the context of prefetching a page surrounding the specific data item request.

Figure 10:
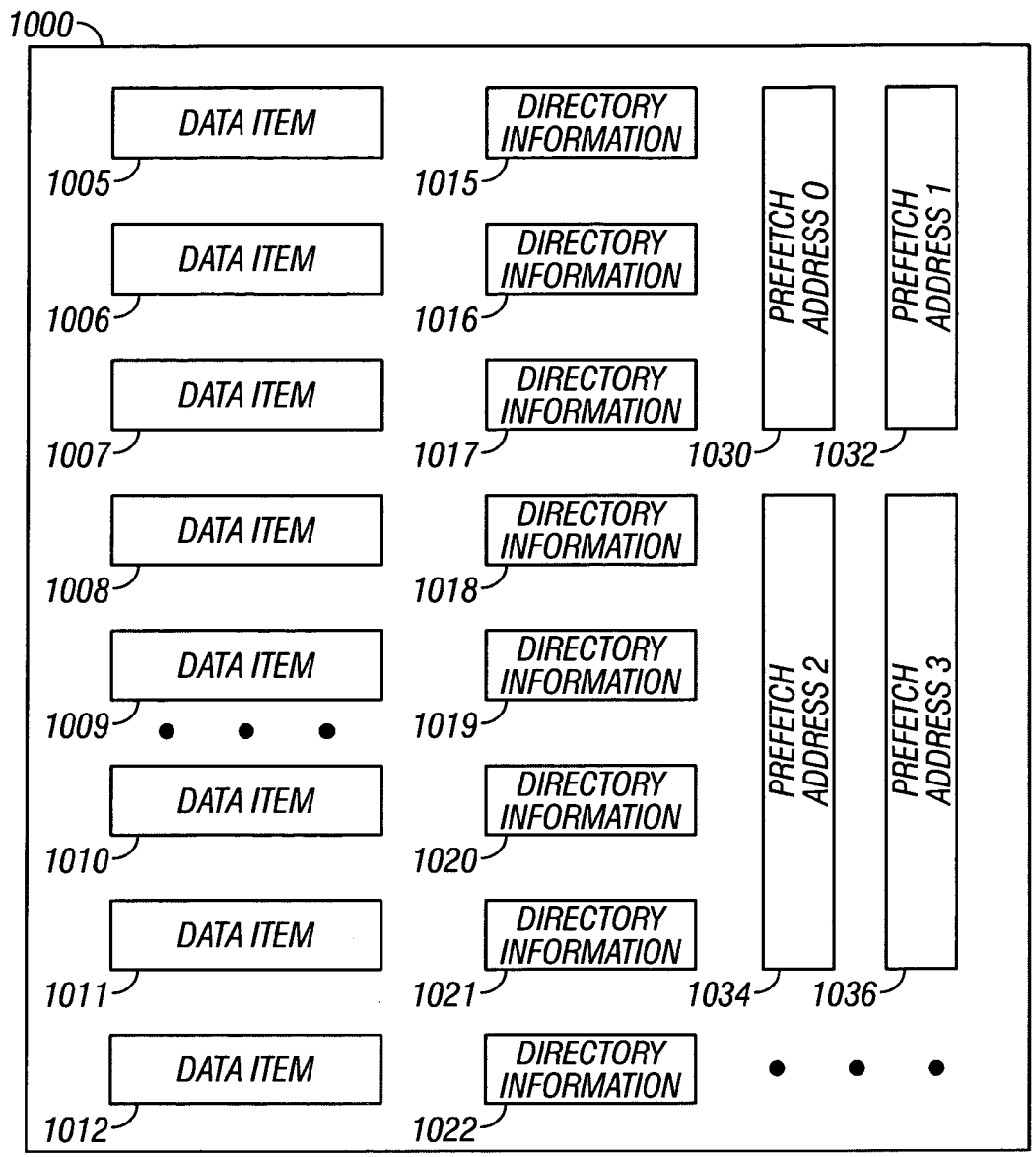
FIG. 10 illustrates an exemplary custom DRAM datagram comprising data and directory information.

Turning now to FIG. 10, a shared memory hierarchy level 1000 contains at least a plurality of data items 1005-1012 of system-specific granularity (for example, a word, a double word, a quad word, cache line, a memory page, etc.). Associated with each data item there is directory information 1015 to 1022 that at least describes the sharing state of each data item associated with the directory information. In addition, shared memory hierarchy level 1000 contains a plurality of locations storing prefetch addresses 1030, 1032, 1034, 1036 corresponding to prefetched pages or other such prefetch requests in accordance with a specific embodiment. In one embodiment, the shared memory hierarchy level is a level of cache backed by external memory, and other cache management data is optionally stored, such as those including but not limited to tags, dirty bits, valid bits, and so forth.

In another embodiment, the memory hierarchy level 1000 is the system memory. In one embodiment, the unit of transfer from the memory-array is a data item. In another embodiment, the unit of transfer consists of a number of bits selected from the memory item. In yet another embodiment, the transfer unit consists of a plurality of data items, such as for example, a page. When practicing the preferred embodiment, the memory array can be addressed using one of many address formats: virtual, segmented, relative, absolute, physical, effective, or any other such address format as can be used to access memory.

In one embodiment, shared memory hierarchy level 1000 optionally supports a set of operations on the directory information, and prefetch address registers, such as read, write, and a limited set of logical operations, to facilitate the execution of coherence actions and update of directory information in accordance with coherence actions being preformed.

Figure 11:
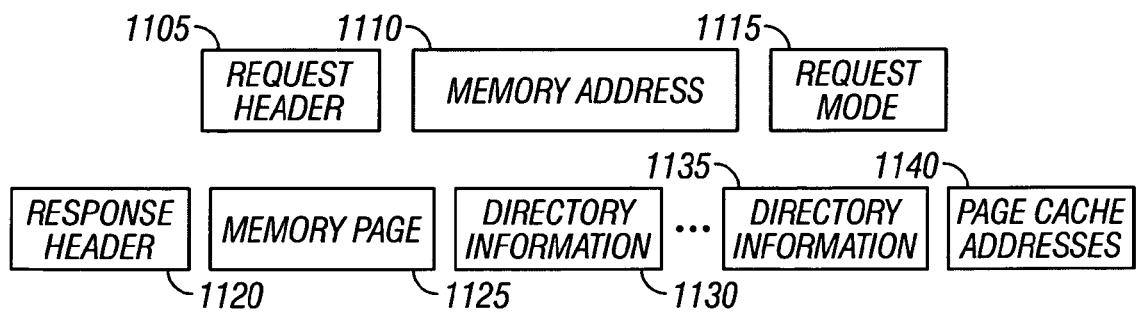
FIG. 11 illustrates an exemplary protocol request and an exemplary protocol response.

Turning now to FIG. 11, there is shown an exemplary protocol request from a node to shared memory hierarchy level 1000, which comprises an optional request header 1105 that may optionally include, but is not limited to, a request sequence number, transaction number, CRC, and so forth. Then, there is the requested memory address 1110. Next, there is a requested memory access mode 1115 (in one embodiment, one of shared and exclusive modes).

Referring to FIG. 11, there is also shown an exemplary protocol response from a shared memory hierarchy level 1000 to a requesting node, which further comprises an optional response header 1120 that may optionally include, but is not limited to, a response sequence number, transaction number, memory address, CRC, etc., the requested data packet 1125, containing a prefetch page containing the requested data item 1005-1012, as well as other data items hierarchically composing the prefetched page.

Then, a sequence of directory information entries 1130-1135 corresponding to the contents of directory information 1015-1022 associated of data items 1005-1012 composing a prefetched page, preferably before an update 820 in accordance with the method of FIG. 8 has been made, and optionally at least one prefetch page cache address 1140 corresponding to the contents of at least one prefetch address register 1030, 1032, 1034, 1036.

Figure 12:
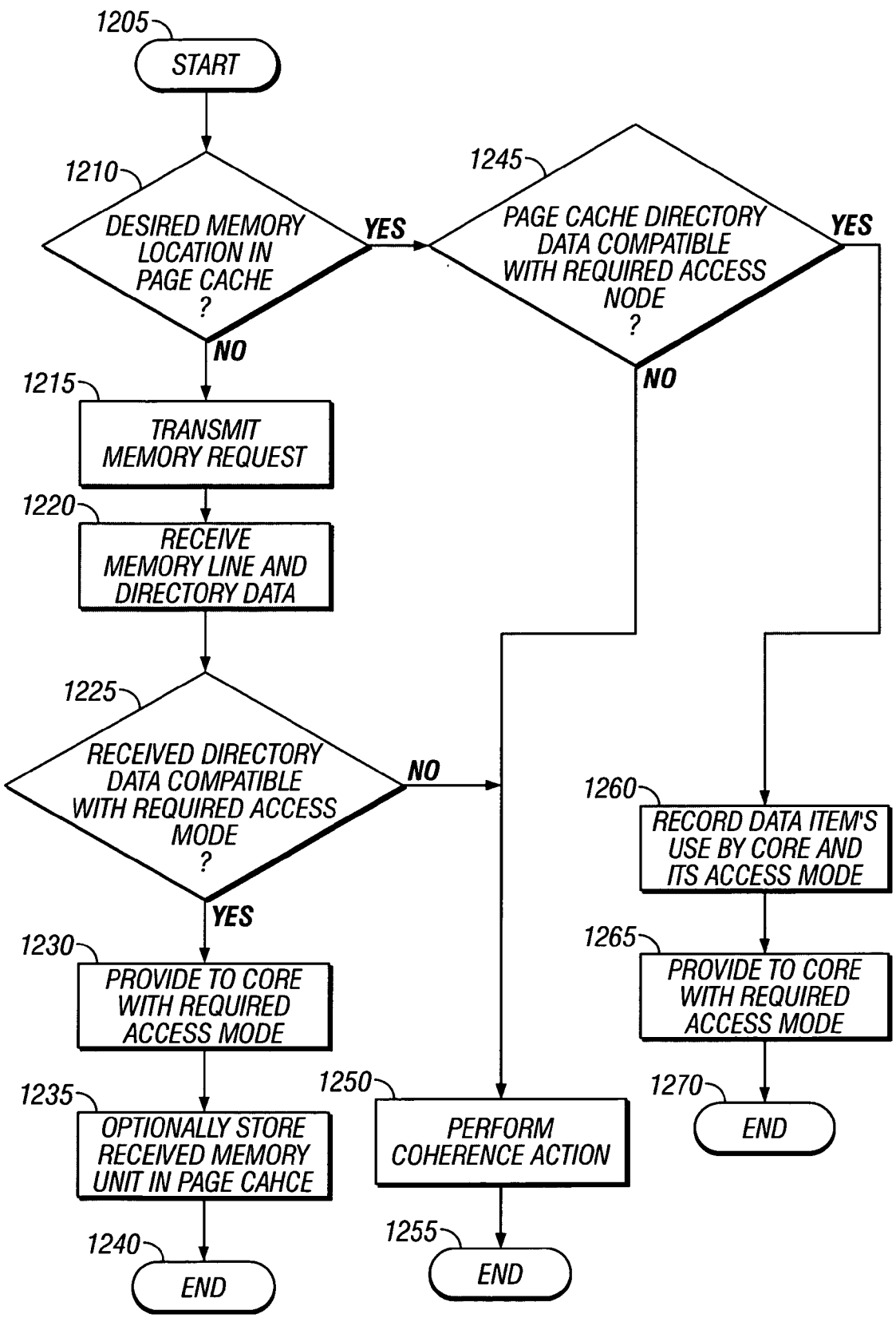
FIG. 12 illustrates an exemplary block diagram displaying an extended method for accessing custom DRAM.

Turning now to FIG. 12, there is shown an exemplary method executed on at least one node to obtain data from a shared memory hierarchy level 1000. According to this method, a first step 1210 tests whether the desired data item is located in the page cache. If this is the case, then the method continues with step 1245. Otherwise, the method continues with step 1215.

In step 1215, the data item has not been found in the page cache, and step 1215 transmits a memory request to shared memory hierarchy level 1000, preferably in, but not limited to, a format such as described by FIG. 11. In a next step 1220, a response to the request is received from the shared memory hierarchy level 1000, preferably in, but not limited to, a format such as described by FIG. 11. In step 1225, there is performed a test to determine if the directory information received in conjunction with requested data items is compatible with the required access mode. If step 1225 determines that the requested data has been successfully retrieved from shared memory hierarchy level 1000 with permissions that are compatible with the requested access mode, the method continues with step 1230. Otherwise, the method continues with step 1250.

In step 1230, when it is determined that the requested data has been successfully retrieved from shared memory hierarchy level 1000 with permissions that are compatible with the requested access mode, the data is provided in step 1230 to at least one processor core in the node for either processing or storage with the requested access mode. In step 1235, the received page and associated directory information is optionally stored in a prefetch page cache.

In step 1245, there is performed a check to see if the directory information cached in the prefetch page cache is compatible with the required access mode. If this step is successful, the method continues in step 1260. Otherwise, the method continues with step 1250.

In step 1250, coherence actions are performed to obtain data items with the requested permission. Coherence actions 1250 for the purpose of this disclosure are all steps designed to obtain data items with appropriate access modes. In one embodiment, this includes using a (possibly slower) coherence bus provided in a system. In another preferred embodiment, this involves operations performed in a dedicated state machine, microcode, millicode, firmware, or software. In one embodiment, the coherence bus is a physical multi-drop coherence bus, in a further embodiment, the coherence bus is a logical coherence bus composed of multiple point-to-point links. In yet another embodiment, there is provided a coherence ring. In other embodiments, coherence actions use special signaling primitives between nodes provided by the system (such as, including but not limited to, processor to processor interrupts), or a messaging and signaling system provided in the memory. Eventually, coherence actions obtain the data with the required access mode and provide them to at least one processor core in the node for either processing or storage with the requested access mode. Coherence actions may further include optionally storing or updating obtained data and directory information in a prefetch page cache.

In step 1260, the request is satisfied from the prefetch page cache, and information is updated. Different embodiments may vary in necessary update steps. In one embodiment, page caches can only satisfy shared data requests, and shared data can be provided immediately, while exclusive access requires refreshing directory information and updating the directory information maintained in 1015-1022. In another embodiment, the update is used to indicate that a specific data item is now copied to a processor local cache for speedy future execution of coherence actions, and so forth.

In step 1265, when it is determined that the requested data has been successfully retrieved from the prefetch page cache (and optional global directory refresh and update, possibly involving additional coherence actions), with permissions which are compatible with the requested access mode, the data is provided to at least one processor core in the node for either processing or storage with the requested access mode.

It is noted that this basic method of FIG. 12 has been described with respect to an exemplary functional flow, but does not describe error handling, time out conditions, receipt of incorrect packets, receipt of packets with inconsistent directory information and so forth, to lay out the basic functionality of the method.

Referring now to step 1225, a method in accordance with FIGS. 8A and 8B can be used, employing a directory for the specific memory subunit being requested. In another embodiment, the methods of FIGS. 8A and 8B are extended to include prefetch information in the testing steps. In one embodiment, this is achieved by extending steps 850 and 870, respectively, to incorporate the prefetch address information into the tests being performed on state variables "shared" and "exclusive". In another embodiment, such steps incorporating prefetch information in directory information is performed by logic in the shared memory hierarchy level 1000.

The logic is presented herewith, in pseudo-notation, to implement a step 1225 in a system where page caches can only hold shared pages, and using directory information layout in accordance with FIG. 7. (This logic is similar in operation to extending the method of FIG. 8A to incorporate prefetch information.)

The statements associated with these functions are as follows.

```
shared = subunit.S[0] OR subunit.S[1] OR subunit.S[2] OR
    subunit.S[3];
exclusive = subunit.E[0] + subunit.E[1] + subunit.E[2] +
    subunit.E [3];
for (I=0 . . . max_remote_cached_pages)
    shared = shared OR (page (this_addr) EQUALS
page (pref_addr[I]);
if ((shared && exclusive) || (exclusive > 1))
    // inconsistent state:
    // observing a pending resolution
    // between two other nodes
    goto protocol_backoff_retry;
else if (acquire_shared && !exclusive)
    // acquiring in shared mode
    // is compatible with other states
    // except exclusive state
    goto protocol_success;
else if (acquire_exclusive &&
    ! (shared || exclusive))
    // acquiring in exclusive mode
    // is compatible with memory
    // resident state only
    goto protocol_success;
else
    // incompatible request
    // with pre-existing state
    goto protocol_acquire;
```

Wherein the "subunit" signal family refers to directory information corresponding specifically with the subunit (for example, cache line or other data item such as stored in 1005-1012) in this exemplary logic fragment refer to the permissions of the subunit at which granularity is maintained in a system which supports page mode requests, where a page consists of multiple subunits, each maintaining separate directory information. Further in this logic description, the function page( ) provides those bits that uniquely identify the prefetch page memory block; the operator EQUALS tests two bits strings for equality and returns TRUE if they are equal; the operators ||, && and ! have semantics of Boolean OR, AND and NOT (similar to the C programming language); the operator [ ] is used to identify single bits from bit strings S and E (of FIG. 7), and array elements of the array pref_addr containing a list of all blocks having been prefetched (and returned to the node in response to a memory request); this_addr refers to the address of the current memory request; the operators OR, AND and NOT implement bitwise OR, AND and NOT; and the "for" keyword provides for looping capability of a variable (specifically I, in this instance) between the specified bounds (specifically, 0 and max_remote_cached_pages, in this instance, the latter representing the number of pages that have been prefetched by various nodes in the system, their addresses being stored in prefetch address registers 1030, 1032, 1034, 1036, and having been transferred to the node in response to a memory request).

While the exemplary code fragment has been presented for an embodiment obtaining prefetch information in shared mode, those skilled in the art will understand that in an environment where page caches may hold exclusive state, additional checks are required, to ensure that the page is not in exclusive mode in a remote page cache. Furthermore certain optimizations are possible, to identify memory subunits which although in exclusive mode in a page cache are already in shared mode and thus safe to acquire, provided that an exclusive acquisition with coherence actions always obtains the most up to date directory information.

Figure 13:
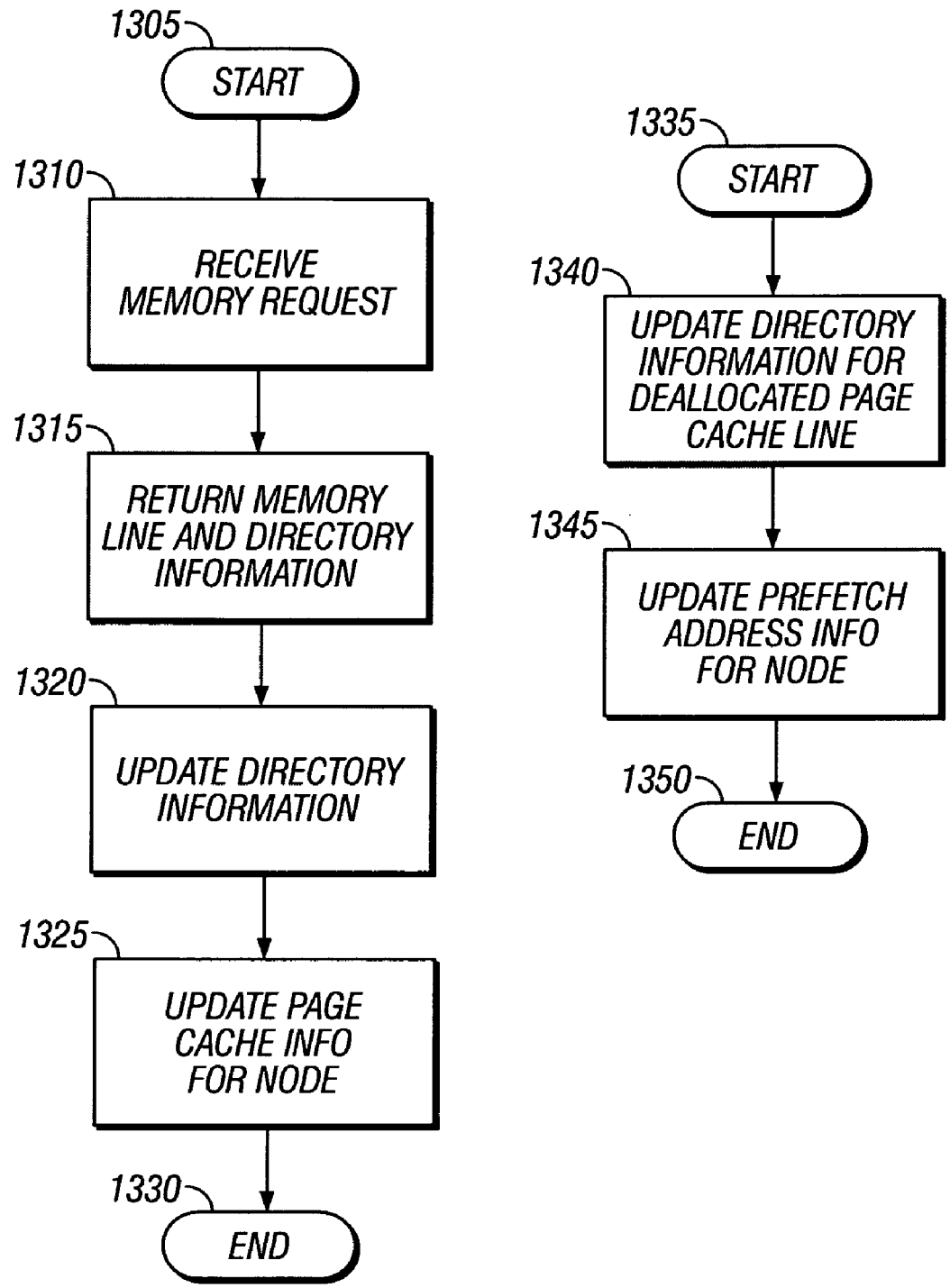
FIG. 13 illustrates an exemplary block diagram for a page cache method function within an extended method for accessing custom DRAM.

Turning now to FIG. 13, there are shown exemplary, methods implemented by the shared memory hierarchy level 1000. In a first method 1305, the shared memory hierarchy level 600 receives a request in a first step 1310, for example, in accordance with the exemplary FIG. 11, over a point to point link from a node. In a second step 1315, a page containing the requested data item as well as other data items hierarchically composing a page selected from data items 1005-1012 are returned to the requesting node, in conjunction with the directory information state 1015-1022 associated with those data items being transferred, as well as contents of prefetch address registers. In one embodiment, all prefetch registers are transmitted. In another embodiment, only those registers having a possible conflict are indicated. In another embodiment, the contents of the prefetch registers 1030-1036 are combined with the directory information 1015-1022 before being transferred in step 1315. In another step 1320, directory information is updated. In another step 1325, page cache information such as prefetch address registers 1030-1036 are updated. Steps 1315, 1320 and 1325 are preferably implemented atomically with respect to other protocol transactions, in particular to other execution instances of steps 1315-1320, or 1340-1345 on behalf of other nodes.

According to FIG. 13, a second method 1335 may optionally be provided to update directory information 1015-1022 in a first step 1340 and prefetch address registers 1030-1036 in a second step 1345.

Figure 14:
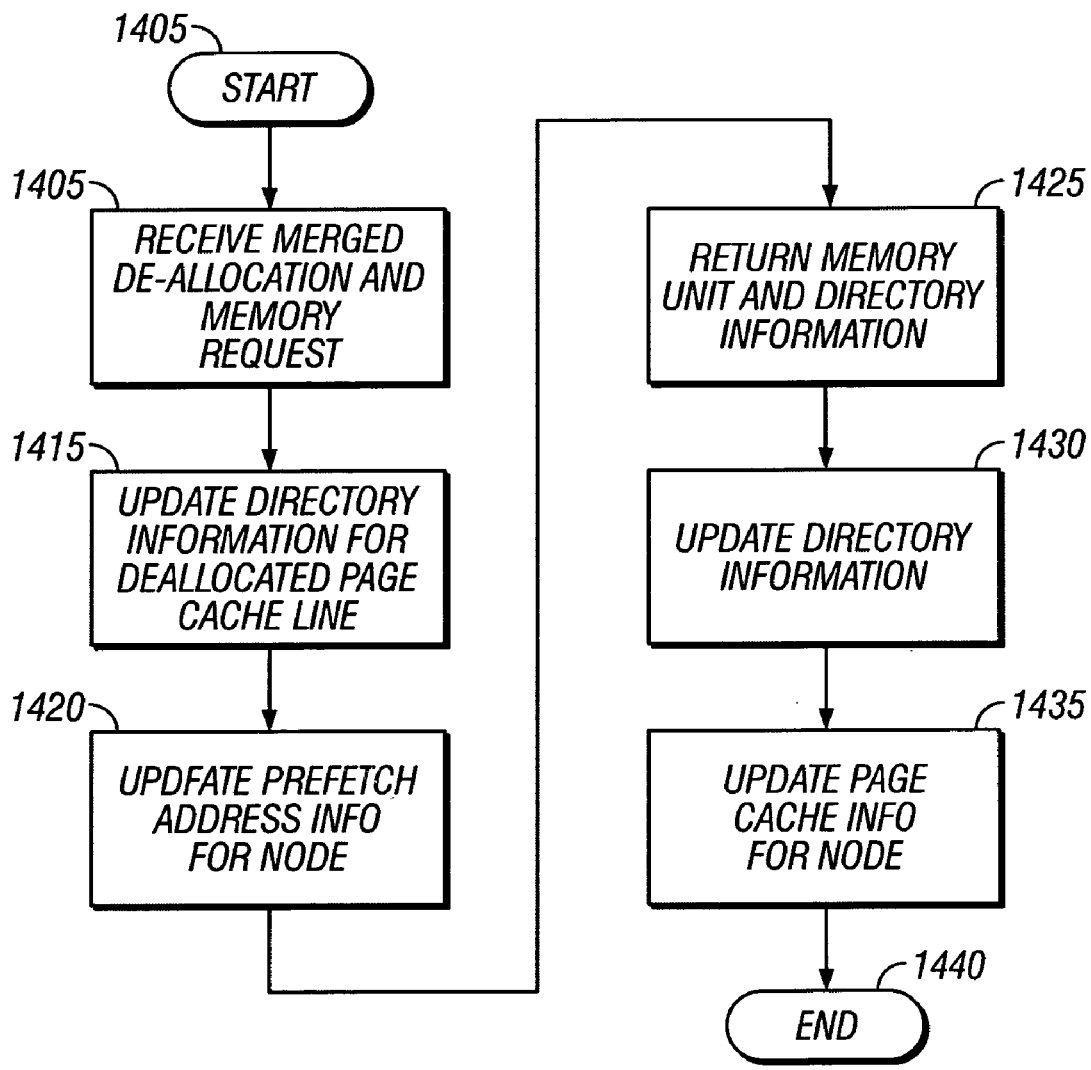
FIG. 14 illustrates an exemplary block diagram displaying an optimized protocol action within an extended method for accessing custom DRAM.

Turning now to FIG. 14, there is shown a method for managing an optimized protocol request which combines the methods of FIG. 13 into a single method in response to a merged protocol request, for improved efficiency.

It will also be apparent that according to the embodiments set forth in this invention, the memory is used as a central integration point. In one aspect of integration, coherence is performed not by a central directory controller, or through a snoop of a central bus, but by reading an updated directory information of a memory component in the system.

In another aspect of using memory as integration point, all signaling, or all high-speed signaling, or substantially all signaling (as measured in a variety of metrics such as aggregate throughput) is performed by transferring bits to and from the memory. In one embodiment, this refers to actual memory reads and writes operations. In another embodiment, the memory component serves as repeater, or router, or star in a centralized point-to-point star network of communication.

In another aspect of this invention, chip stacking is used to physically integrate the system, processing element chips being physically stacked onto or with a memory component, and the memory component serves as physical integration point. In one specific embodiment, C4 connectors are used to connect chip-stacked processing elements and memory component chips. In another aspect of this invention, wire-bonding is used to connect chip-stacked processing elements and memory component chips.

While the features of three separate embodiments have been set forth, each of the described embodiments can be augmented by elements of one of the other embodiments, to provide the desirable characteristics of several of these.

It is understood that the present invention can take many forms and implementations. Accordingly, several variations may be made in the foregoing without departing from the spirit or the scope of the invention. The capabilities outlined herein allow for the possibility of a variety of design and programming models. This disclosure should not be read as preferring any particular design or programming model, but is instead directed to the underlying mechanisms on which these design and programming models can be built.

Having thus described the present invention by reference to certain of its salient characteristics, it is noted that the features disclosed are illustrative rather than limiting in nature. A wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description.

The invention claimed is:

1. A system, comprising:
    a memory comprising:
        a plurality of data items and a plurality of directory information items, each data item uniquely associated with one of the plurality of directory information items;
        wherein each of the plurality of data items is configured in accordance with one of a plurality of access modes;
        wherein each of the plurality of directory information items comprises indicia of the access mode of its associated data item;
        a multiplexer coupled to the memory and comprising a multiplex ratio;
        a plurality of buffers coupled to the multiplexer and to the memory;
        wherein the multiplex ratio is a function of the number of buffers in the plurality of buffers; and
        a plurality of multiplexer/demultiplexers (MDMs), each MDM uniquely coupled to a different one of the plurality of buffers;
    a plurality of processing elements coupled to the memory, wherein each of the processing elements uniquely couples in a point-to-point connection to a different one of the plurality of MDMs;
    wherein each of the processing elements is configured to transmit a data request to its associated MDM, the data request identifying one of the plurality of data items and an access mode;
    wherein each of the processing elements further comprises a prefetch page cache, the prefetch page cache configured to store a subset of the plurality of data items and the plurality of directory information items;
    wherein the memory is configured to transmit a data response to each of the processing elements in response to a data request, the data response comprising the identified data item and its associated directory information, independent of whether the associated directory information indicates an access mode compatible with the requested access mode; and
    wherein each of the processing elements is further configured:
        to receive the data response and to compare the associated directory information with the access mode of the data request; and
        in the event that the associated directory information and the access mode of the data request are not compatible, to initiate coherence actions for the requested data item.

2. The system of claim 1:
    wherein each of the plurality of directory information items further comprises a prefetch cache tag; and
    wherein the prefetch page cache is further configure to store the subset of the plurality of data items and the plurality of directory information items based on the prefetch cache tags.

3. The system of claim 1, wherein the memory further comprises coherence logic configured to initiate coherence actions in response to a request from a processing unit.

4. The system of claim 1, wherein the coherence actions are performed by the memory.

5. The system of claim 1, wherein the coherence actions are performed on a bus separate from the point-to-point connections between the processing elements and the MDMs.

6. The system of claim 1, wherein the coherence actions are performed by processing elements associated with the access mode of the data item.

7. The system of claim 1, wherein each of the plurality of directory information items further comprises indicia of the access mode of a subset of its associated data item.

8. The system of claim 1, wherein the each of the plurality of directory information items further comprises one-hot encoding indicating an exclusive access mode associated with one of the plurality of processing elements.

9. The system of claim 1, wherein the directory information comprises a plurality of bits, one half of the bits indicating a shared state and the remaining one half of the bits indicating an exclusive state, with each of the plurality of bits associated with one of the plurality of processing elements.

10. The system of claim 1, wherein the memory further couples to a visualizer.

11. The system of claim 1, wherein the memory further couples to a main memory.

12. A method for cache coherency, comprising:
    storing, by a memory, a plurality of data items and a plurality of directory information items, each data item uniquely associated with one of the plurality of directory information items;
        wherein each of the plurality of data items is configured in accordance with one of a plurality of access modes; and
        wherein each of the plurality of directory information items comprises indicia of the access mode of its associated data item and a prefetch tag;
    storing, in a local cache by a processing element comprising the local cache, a subset of the plurality of data items and associated directory information items;
    determining, by the processing element, whether a requested data item resides in the local cache of the processing element;
    in the event the requested data item does reside in the local cache, determining, by the processing element, whether the prefetch tag indicates that the requested data item is available;
    in the event the requested data item does not reside in the local cache of the processing element or in the event that the prefetch tag indicates that the requested data item is not available, transmitting, through a point-to-point connection to a dedicated buffer of the memory, a data request to the memory;
        wherein the data request identifies the requested data item and a requested access mode;
    determining, by the memory, whether the requested data item resides in the memory;

in the event the requested data item resides in the memory, transmitting to the processing element a data response, wherein the data response comprises the requested data item and its associated directory information, independent of whether the associated directory information indicates an access mode compatible with the requested access mode;

receiving, by the processing element, the requested data item and its associated directory information;

determining, by the processing element, whether the received associated directory information indicates an access mode compatible with the requested access mode; and in the event the received associated directory information does not indicate an access mode compatible with the requested access mode, initiating, by the processing element, coherency actions for the requested data item.

13. The method of claim 12, wherein each of the plurality of directory information items further comprises indicia of the access mode of a subset of its associated data item.

14. The method of claim 12, wherein the each of the plurality of directory information items further comprises one-hot encoding indicating an exclusive access mode associated with one of the plurality of processing elements.

15. The method of claim 12, wherein the directory information comprises a plurality of bits, one half of the bits indicating a shared state and the remaining one half of the bits indicating an exclusive state, with each of the plurality of bits associated with one of the plurality of processing elements.

16. The method of claim 12, further comprising:
in the event the received associated directory information does indicate an access mode compatible with the requested access mode, storing, by the processing element, the requested data item and its associated directory information in the local cache.

17. A computer program product comprising a computer-readable medium having computer program code for cache coherency, the computer program product comprising:
computer program code for storing, by a memory, a plurality of data items and a plurality of directory information items, each data item uniquely associated with one of the plurality of directory information items;
wherein each of the plurality of data items is configured in accordance with one of a plurality of access modes; and
wherein each of the plurality of directory information items comprises indicia of the access mode of its associated data item and a prefetch tag;
computer program code for storing, in a local cache by a processing element comprising the local cache, a subset of the plurality of data items and associated directory information items;
computer program code for determining, by the processing element, whether a requested data item resides in the local cache of the processing element;
computer program code for, in the event the requested data item does reside in the local cache, determining, by the processing element, whether the prefetch tag indicates that the requested data item is available;
computer program code for, in the event the requested data item does not reside in the local cache of the processing element or in the event that the prefetch tag indicates that the requested data item is not available, transmitting, through a point-to-point connection to a dedicated buffer of the memory, a data request to the memory;
wherein the data request identifies the requested data item and a requested access mode;
computer program code for determining, by the memory, whether the requested data item resides in the memory;
computer program code for, in the event the requested data item resides in the memory, transmitting to the processing element a data response, wherein the data response comprises the requested data item and its associated directory information, independent of whether the associated directory information indicates an access mode compatible with the requested access mode;
computer program code for receiving, by the processing element, the requested data item and its associated directory information;
computer program code for determining, by the processing element, whether the received associated directory information indicates an access mode compatible with the requested access mode; and
computer program code for, in the event the received associated directory information does not indicate an access mode compatible with the requested access mode, initiating, by the processing element, coherency actions for the requested data item.

18. The computer program product of claim 17, wherein each of the plurality of directory information items further comprises indicia of the access mode of a subset of its associated data item.

19. The computer program product of claim 17, wherein the each of the plurality of directory information items further comprises one-hot encoding indicating an exclusive access mode associated with one of the plurality of processing elements.

20. The computer program product of claim 17, wherein the directory information comprises a plurality of bits, one half of the bits indicating a shared state and the remaining one half of the bits indicating an exclusive state, with each of the plurality of bits associated with one of the plurality of processing elements.

21. The computer program product of claim 17, further comprising:
computer program code for, in the event the received associated directory information does indicate an access mode compatible with the requested access mode, storing, by the processing element, the requested data item and its associated directory information in the local cache.

* * * * *